US012720536B2

(12) United States Patent
Rico Alvarino et al.

(10) Patent No.: US 12,720,536 B2
(45) Date of Patent: Aug. 25, 2026

(54) CARRIER SWITCHING WITH UPLINK CARRIER AGGREGATION CAPABILITY

(71) Applicant: QUALCOMM Incorporated, San Diego, CA (US)

(72) Inventors: Alberto Rico Alvarino, San Diego, CA (US); Peter Gaal, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 18/546,873

(22) PCT Filed: Mar. 22, 2022

(86) PCT No.: PCT/US2022/021296
§ 371 (c)(1),
(2) Date: Aug. 17, 2023

(87) PCT Pub. No.: WO2022/221006
PCT Pub. Date: Oct. 20, 2022

(65) Prior Publication Data

US 2024/0147468 A1 May 2, 2024

(30) Foreign Application Priority Data

Apr. 14, 2021 (GR) .............................. 20210100256

(51) Int. Cl.
*H04W 72/51* (2023.01)
*H04L 5/00* (2006.01)
*H04W 72/1268* (2023.01)

(52) U.S. Cl.
CPC ......... *H04W 72/1268* (2013.01); *H04L 5/001* (2013.01); *H04L 5/0051* (2013.01); *H04W 72/51* (2023.01)

(58) Field of Classification Search
CPC ................................................ H04W 72/1268
See application file for complete search history.

(56) References Cited

U.S. PATENT DOCUMENTS

2013/0163492 A1 6/2013 Wong
2019/0044678 A1* 2/2019 Liu ....................... H04L 27/261
2022/0045704 A1* 2/2022 Kim .................... H04B 1/1018

OTHER PUBLICATIONS

International Search Report and Written Opinion—PCT/US2022/021296—ISA/EPO—Jun. 22, 2022.

* cited by examiner

*Primary Examiner* — Pamit Kaur
(74) *Attorney, Agent, or Firm* — Holland & Hart LLP

(57) ABSTRACT

Methods, systems, and devices for wireless communication are described. A user equipment (UE) may transmit a capability message indicating that the UE supports operation in an enhanced uplink carrier aggregation mode for transmission of a first uplink message on a first component carrier overlapping in time with transmission of a second uplink message on a second component carrier. The transmission of the second uplink message may be associated with one or more interruption time gaps on the first component carrier. The UE may transmit the first uplink message on the first component carrier and the second uplink message on the second component carrier in accordance with the enhanced uplink carrier aggregation mode.

30 Claims, 20 Drawing Sheets

Figure 17:
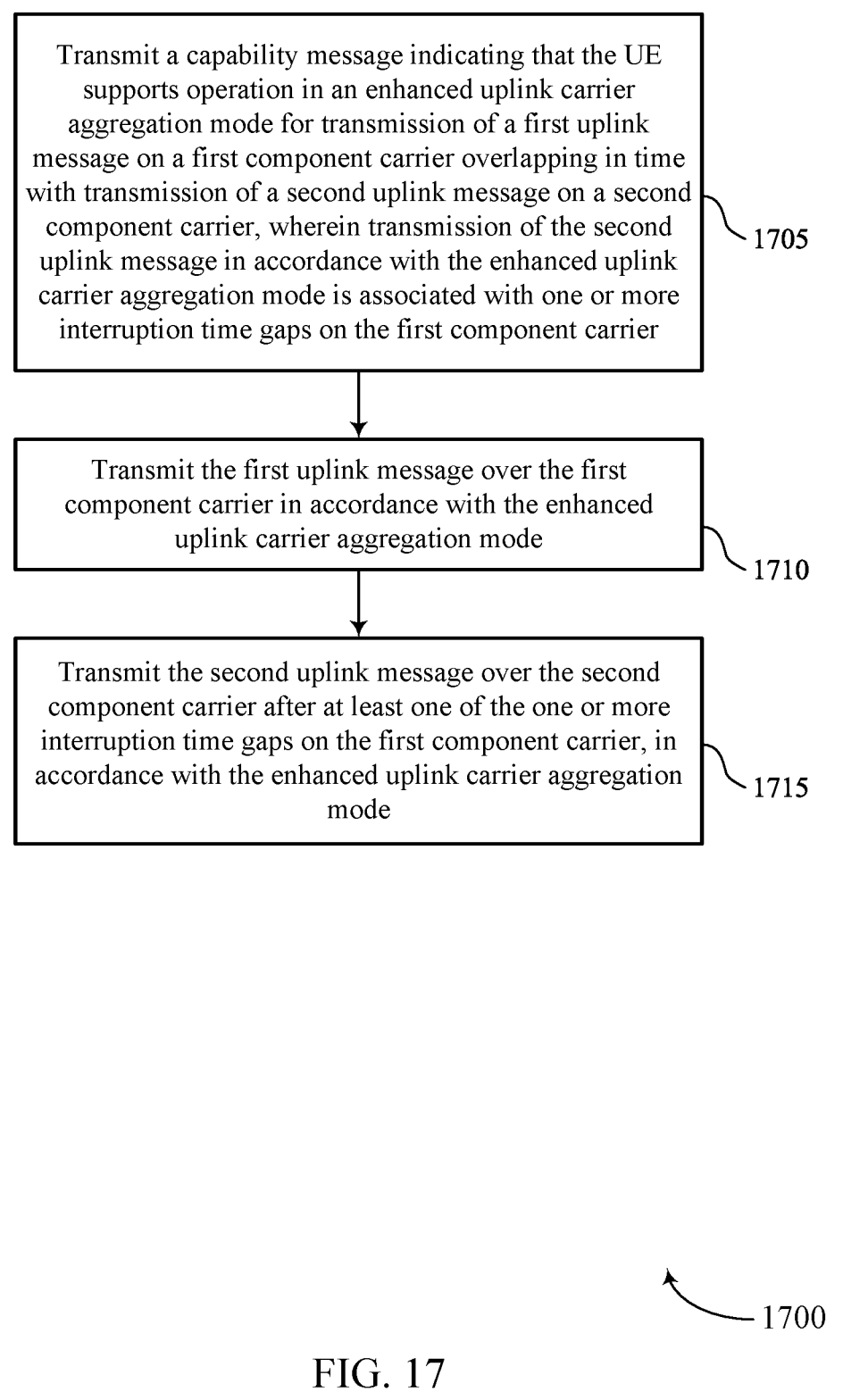

Transmit a capability message indicating that the UE supports operation in an enhanced uplink carrier aggregation mode for transmission of a first uplink message on a first component carrier overlapping in time with transmission of a second uplink message on a second component carrier, wherein transmission of the second uplink message in accordance with the enhanced uplink carrier aggregation mode is associated with one or more interruption time gaps on the first component carrier

1705

Transmit the first uplink message over the first component carrier in accordance with the enhanced uplink carrier aggregation mode

1710

Transmit the second uplink message over the second component carrier after at least one of the one or more interruption time gaps on the first component carrier, in accordance with the enhanced uplink carrier aggregation mode

Figure 20:
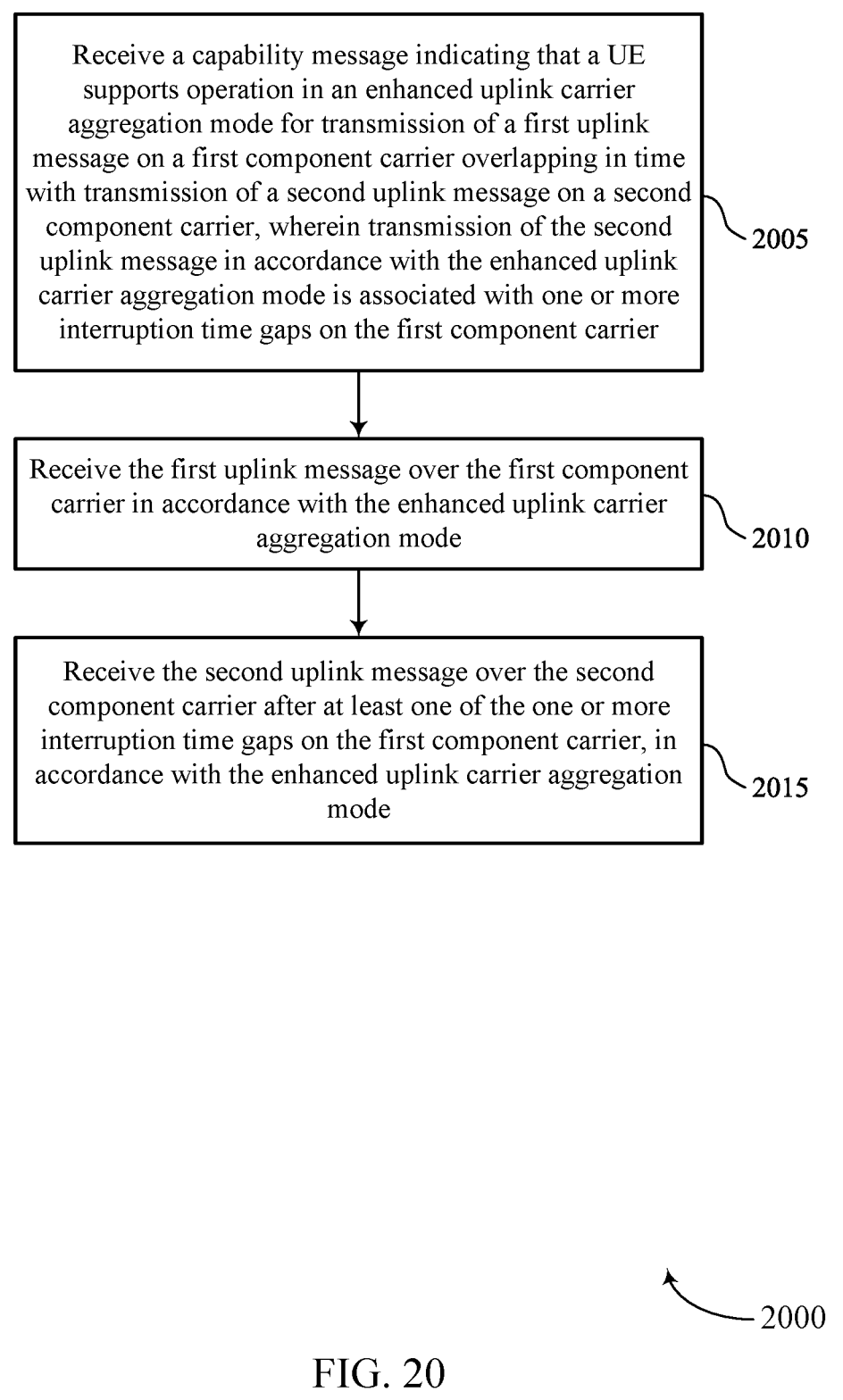

Receive a capability message indicating that a UE supports operation in an enhanced uplink carrier aggregation mode for transmission of a first uplink message on a first component carrier overlapping in time with transmission of a second uplink message on a second component carrier, wherein transmission of the second uplink message in accordance with the enhanced uplink carrier aggregation mode is associated with one or more interruption time gaps on the first component carrier

2005

Receive the first uplink message over the first component carrier in accordance with the enhanced uplink carrier aggregation mode

2010

Receive the second uplink message over the second component carrier after at least one of the one or more interruption time gaps on the first component carrier, in accordance with the enhanced uplink carrier aggregation mode

CARRIER SWITCHING WITH UPLINK CARRIER AGGREGATION CAPABILITY

CROSS REFERENCE

The present application is a 371 national stage filing of International PCT Application No. PCT/US2022/021296 by RICO ALVARINO et al. entitled "CARRIER SWITCHING WITH UPLINK CARRIER AGGREGATION CAPABILITY," filed Mar. 22, 2022; and claims priority to Greek Patent Application No. 20210100256 by RICO ALVARINO et al., entitled "CARRIER SWITCHING WITH UPLINK CARRIER AGGREGATION CAPABILITY," filed Apr. 14, 2021, each of which is assigned to the assignee hereof, and each of which is expressly incorporated by reference in its entirety herein.

FIELD OF TECHNOLOGY

The following relates to wireless communication, including carrier switching with uplink carrier aggregation capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

Some wireless communications systems support communications between a UE and a network entity on multiple carriers. In some cases, the UE may tune between carriers to transmit one or more sounding reference signals (SRSs) to the network entity.

SUMMARY

The described techniques relate to improved methods, systems, devices, and apparatuses that support carrier switching with uplink carrier aggregation capability. Generally, the described techniques provide for a user equipment (UE) to operate in an enhanced uplink carrier aggregation mode for transmission of uplink messages on two or more component carriers. The UE may transmit a capability message to a network entity. In some examples, the capability message may indicate that the UE supports operation in the enhanced uplink carrier aggregation mode for transmission of a first uplink message on a first component carrier overlapping in time with transmission of a second uplink message on a second component carrier. The transmission of the second uplink message in accordance with the enhanced uplink carrier aggregation mode may result in one or more interruption time gaps in the uplink transmissions on the first component carrier. The UE may receive a control message from the network entity in response to the capability message. The control message may indicate a configuration for the UE to operate in the enhanced uplink carrier aggregation mode. The UE may transmit the first uplink message over the first component carrier and the second uplink message over the second component carrier in accordance with the enhanced uplink carrier aggregation mode. In some examples, the UE may transmit the second uplink message after at least one of the one or more interruption time gaps on the first component carrier. The UE may thereby support uplink carrier aggregation for transmission of the first and second uplink messages while reducing power consumption by the UE.

A method for wireless communication at a UE is described. The method may include transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, transmitting the first uplink message over the first component carrier in accordance with the enhanced uplink carrier aggregation mode, and transmitting the second uplink message over the second component carrier after at least one of the one or more interruption time gaps on the first component carrier, in accordance with the enhanced uplink carrier aggregation mode.

An apparatus for wireless communication at a UE is described. The apparatus may include a processor, memory coupled with the processor, and instructions stored in the memory. The instructions may be executable by the processor to cause the apparatus to transmit a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, transmit the first uplink message over the first component carrier in accordance with the enhanced uplink carrier aggregation mode, and transmit the second uplink message over the second component carrier after at least one of the one or more interruption time gaps on the first component carrier, in accordance with the enhanced uplink carrier aggregation mode.

Another apparatus for wireless communication at a UE is described. The apparatus may include means for transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, means for transmitting the first uplink message over the first component carrier in accordance with the enhanced uplink carrier aggregation mode, and means for transmitting the second uplink message over the second component carrier after at least one of the one or more interruption time gaps on the first component carrier, in accordance with the enhanced uplink carrier aggregation mode.

A non-transitory computer-readable medium storing code for wireless communication at a UE is described. The code may include instructions executable by a processor to transmit a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, transmit the first uplink message over the first component carrier in accordance with the enhanced uplink carrier aggregation mode, and transmit the second uplink message over the second component carrier after at least one of the one or more interruption time gaps on the first component carrier, in accordance with the enhanced uplink carrier aggregation mode.

In some examples of the method, apparatuses, and non-transitory computer-readable medium described herein, transmitting the capability message may include operations, features, means, or instructions for signaling support for the enhanced uplink carrier aggregation mode on a per component carrier basis.

In some examples of the method, apparatuses, and non-transitory computer-readable medium described herein, transmitting the capability message may include operations, features, means, or instructions for indicating, for the second component carrier, that the UE may be capable of transitioning a transmit chain associated with the second component carrier between a dormant mode and an active mode.

In some examples of the method, apparatuses, and non-transitory computer-readable medium described herein, transmitting the capability message may include operations, features, means, or instructions for indicating a duration of the one or more interruption time gaps.

Some examples of the method, apparatuses, and non-transitory computer-readable medium described herein may include operations, features, means, or instructions for receiving, based on the transmitting of the capability message, a control message that indicates a configuration for the UE to operate in the enhanced uplink carrier aggregation mode.

In some examples of the method, apparatuses, and non-transitory computer-readable medium described herein, receiving the control message that indicates the configuration may include operations, features, means, or instructions for receiving a configuration bit per component carrier, the configuration bit indicating whether the UE is to operate in the enhanced uplink carrier aggregation mode.

Some examples of the method, apparatuses, and non-transitory computer-readable medium described herein may further include operations, features, means, or instructions for operating, in accordance with the enhanced uplink carrier aggregation mode, a transmit chain associated with the second component carrier in a dormant mode prior to a scheduled transmission of the second uplink message over the second component carrier, activating the transmit chain during at least one of the one or more interruption time gaps, operating, in accordance with the enhanced uplink carrier aggregation mode, the transmit chain in an active mode during the scheduled transmission of the second uplink message over the second component carrier, and transitioning the transmit chain from the active mode to the dormant mode after transmission of the second uplink message.

In some examples of the method, apparatuses, and non-transitory computer-readable medium described herein, transitioning the transmit chain from the active mode to the dormant mode may include operations, features, means, or instructions for activating a timer based on transmission of the second uplink message and transitioning the transmit chain from the active mode to the dormant mode after expiration of the timer.

Some examples of the method, apparatuses, and non-transitory computer-readable medium described herein may further include operations, features, means, or instructions for resetting the timer prior to expiration of the timer and based on the UE being scheduled to transmit additional uplink messages over the second component carrier.

In some examples of the method, apparatuses, and non-transitory computer-readable medium described herein, the first uplink message and the second uplink message may be each sounding reference signal (SRS) messages.

In some examples of the method, apparatuses, and non-transitory computer-readable medium described herein, transmitting the capability message may include operations, features, means, or instructions for signaling support for both uplink carrier aggregation and SRS carrier switching.

In some examples of the method, apparatuses, and non-transitory computer-readable medium described herein, transmitting the capability message may include operations, features, means, or instructions for indicating support for simultaneous transmissions in connection with SRS carrier switching.

A method for wireless communication at a network entity is described. The method may include receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, receiving the first uplink message over the first component carrier in accordance with the enhanced uplink carrier aggregation mode, and receiving the second uplink message over the second component carrier after at least one of the one or more interruption time gaps on the first component carrier, in accordance with the enhanced uplink carrier aggregation mode.

An apparatus for wireless communication at a network entity is described. The apparatus may include a processor, memory coupled with the processor, and instructions stored in the memory. The instructions may be executable by the processor to cause the apparatus to receive a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, receive the first uplink message over the first component carrier in accordance with the enhanced uplink carrier aggregation mode, and receive the second uplink message over the second component carrier after at least one of the one or more interruption time gaps on the first component carrier, in accordance with the enhanced uplink carrier aggregation mode.

Another apparatus for wireless communication at a network entity is described. The apparatus may include means for receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, means for receiving the first uplink message over the first component carrier in accordance with the enhanced uplink carrier aggregation mode, and means for receiving the second uplink message over the second component carrier after at least one of the one or more interruption time gaps on the first component carrier, in accordance with the enhanced uplink carrier aggregation mode.

A non-transitory computer-readable medium storing code for wireless communication at a network entity is described. The code may include instructions executable by a processor to receive a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier, receive the first uplink message over the first component carrier in accordance with the enhanced uplink carrier aggregation mode, and receive the second uplink message over the second component carrier after at least one of the one or more interruption time gaps on the first component carrier, in accordance with the enhanced uplink carrier aggregation mode.

In some examples of the method, apparatuses, and non-transitory computer-readable medium described herein, receiving the capability message may include operations, features, means, or instructions for receiving an indication of support for the enhanced uplink carrier aggregation mode on a per component carrier basis.

In some examples of the method, apparatuses, and non-transitory computer-readable medium described herein, receiving the capability message may include operations, features, means, or instructions for receiving an indication, for the second component carrier, that the UE may be capable of transitioning a transmit chain associated with the second component carrier between a dormant mode and an active mode.

In some examples of the method, apparatuses, and non-transitory computer-readable medium described herein, receiving the capability message may include operations, features, means, or instructions for receiving an indication of a duration of the one or more interruption time gaps.

Some examples of the method, apparatuses, and non-transitory computer-readable medium described herein may include operations, features, means, or instructions for transmitting, based on the capability message, a control message that indicates a configuration for the UE to operate in the enhanced uplink carrier aggregation mode.

In some examples of the method, apparatuses, and non-transitory computer-readable medium described herein, transmitting the control message that indicates the configuration may include operations, features, means, or instructions for transmitting a configuration bit per component carrier, the configuration bit indicating whether the UE is to operate in the enhanced uplink carrier aggregation mode.

In some examples of the method, apparatuses, and non-transitory computer-readable medium described herein, the first uplink message and the second uplink message may be each SRS messages.

In some examples of the method, apparatuses, and non-transitory computer-readable medium described herein, receiving the capability message may include operations, features, means, or instructions for receiving an indication of support for both uplink carrier aggregation and SRS carrier switching.

In some examples of the method, apparatuses, and non-transitory computer-readable medium described herein, receiving the capability message may include operations, features, means, or instructions for receiving an indication of support for simultaneous transmissions in connection with SRS carrier switching.

BRIEF DESCRIPTION OF THE DRAWINGS

FIG. 4 illustrates an example of a component carrier switching timeline that supports carrier switching with uplink carrier aggregation capability in accordance with aspects of the present disclosure.

FIGS. 17 through 20 show flowcharts illustrating methods that support carrier switching with uplink carrier aggregation capability in accordance with aspects of the present disclosure.

DETAILED DESCRIPTION

Figure 1:
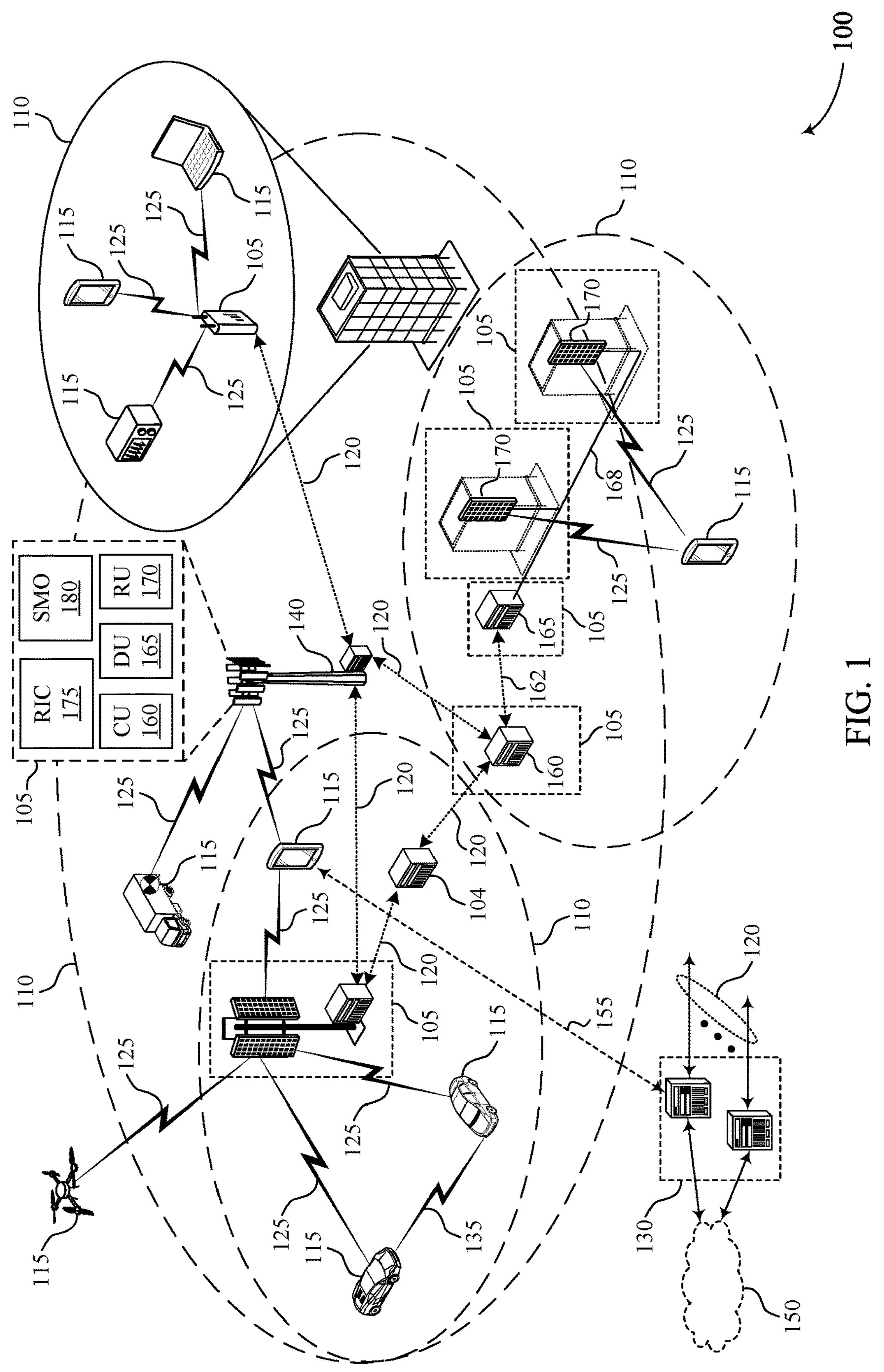
FIG. 1 illustrates an example of a wireless communications system that supports carrier switching with uplink carrier aggregation capability in accordance with aspects of the present disclosure.

In some wireless communications systems, a user equipment (UE) and a network entity may communicate via one or more component carriers. Each component carrier may be configured to support uplink communications, downlink communications, or both (e.g., in a time division duplexing (TDD) mode of operation). In some examples, the UE may perform uplink carrier switching for a scheduled uplink transmission, such as a sounding reference signal (SRS) transmission or transmission of another uplink message. For example, the UE may perform one or more uplink transmissions on a first component carrier, and the UE may retune to a second component carrier to perform the scheduled uplink transmission (e.g., to obtain channel state information (CSI) via reciprocity). In some cases, the UE may support uplink carrier aggregation on the first and second component carriers. That is, the UE may be capable of simultaneous transmission on the first and second component carriers using first and second transmit chains. Continuous activation of the first and second transmit chains may result in relatively high power consumption by the UE.

As described herein, a UE may indicate a capability to operate in an enhanced uplink carrier aggregation mode to support uplink carrier aggregation techniques while utilizing a component carrier switching framework to reduce power consumption by the UE. The enhanced uplink carrier aggregation mode may provide for at least partially simultaneous transmissions of a first uplink message on a first component carrier and a second uplink message on a second component carrier. Transmission of the second uplink message in accordance with the enhanced uplink carrier aggregation mode may interrupt uplink transmissions, downlink receptions, or both by the UE on the first component carrier. A network entity may receive an indication of the UE capability and, in some examples, the network entity may configure the UE to operate in the enhanced uplink carrier aggregation mode.

The UE may signal support for the enhanced uplink carrier aggregation mode on a per component carrier basis. In some examples, the network entity may indicate whether the UE is to operate in the enhanced uplink carrier aggregation mode on a per component carrier basis. For example, the network entity may transmit a configuration bit per component carrier to indicate the configuration. In some other examples, the UE may signal support for the enhanced uplink carrier aggregation on a per band basis, or per band of band combination basis. The UE may additionally or alternatively indicate whether the UE is capable of transitioning a transmit chain associated with a component carrier between a dormant mode (e.g., the transmit chain is off, such that the UE may not perform uplink transmission on the corresponding component carrier) and an active mode (e.g., the transmit chain is on and the UE is prepared to perform uplink transmission on the component carrier).

In some examples, operations according to the enhanced uplink carrier aggregation configuration may include continuously, or near-continuously, operating a first transmit chain associated with a first component carrier in an active mode, and operating a second transmit chain associated with a second component carrier in a dormant mode until a scheduled uplink transmission. The UE may transition the second transmit chain to the active mode to perform the scheduled uplink transmission, and the UE may transition the second transmit chain back to the dormant mode after performing the scheduled uplink transmission. The UE may activate and deactivate the second transmit chain during interruption time gaps that may interrupt, or pause, uplink communications by the UE on the first component carrier. The interruption time gaps may be similar to switching gaps configured for a UE to retune between component carriers while performing uplink carrier switching. The UE may thereby consume less power while operating in accordance with the enhanced uplink carrier aggregation mode as compared with operations in an uplink carrier aggregation mode.

Aspects of the disclosure are initially described in the context of wireless communications systems. Additional aspects of the disclosure are described in the context of component carrier configurations, component carrier switching timelines, component carrier activation timelines, and process flows. Aspects of the disclosure are further illustrated by and described with reference to apparatus diagrams, system diagrams, and flowcharts that relate to carrier switching with uplink carrier aggregation capability.

FIG. 1 illustrates an example of a wireless communications system 100 that supports carrier switching with uplink carrier aggregation capability in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support carrier switching with uplink carrier aggregation capability as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARM) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 as described herein may transmit a capability message to a network entity 105. The capability message may indicate that the UE 115 supports operation in an enhanced uplink carrier aggregation mode for transmission of a first uplink message on a first component carrier overlapping in time with transmission of a second uplink message on a second component carrier. The transmission of the second uplink message on the second component carrier may result in one or more interruption time gaps in the uplink transmissions on the first component carrier. The UE 115 may, in some examples, receive a control message from the network entity 105 in response to the capability message. The control message may indicate a configuration for the UE 115 to operate in the enhanced uplink carrier aggregation mode. The UE 115 may transmit the first uplink message over the first component carrier and the second uplink message over the second component carrier in accordance with the enhanced uplink carrier aggregation mode. In some examples, the UE 115 may transmit the second uplink message after at least one of the one or more interruption time gaps on the first component carrier. The UE 115 may thereby support uplink carrier aggregation for transmission of the first and second uplink messages while reducing power consumption by the UE 115.

Figure 2:
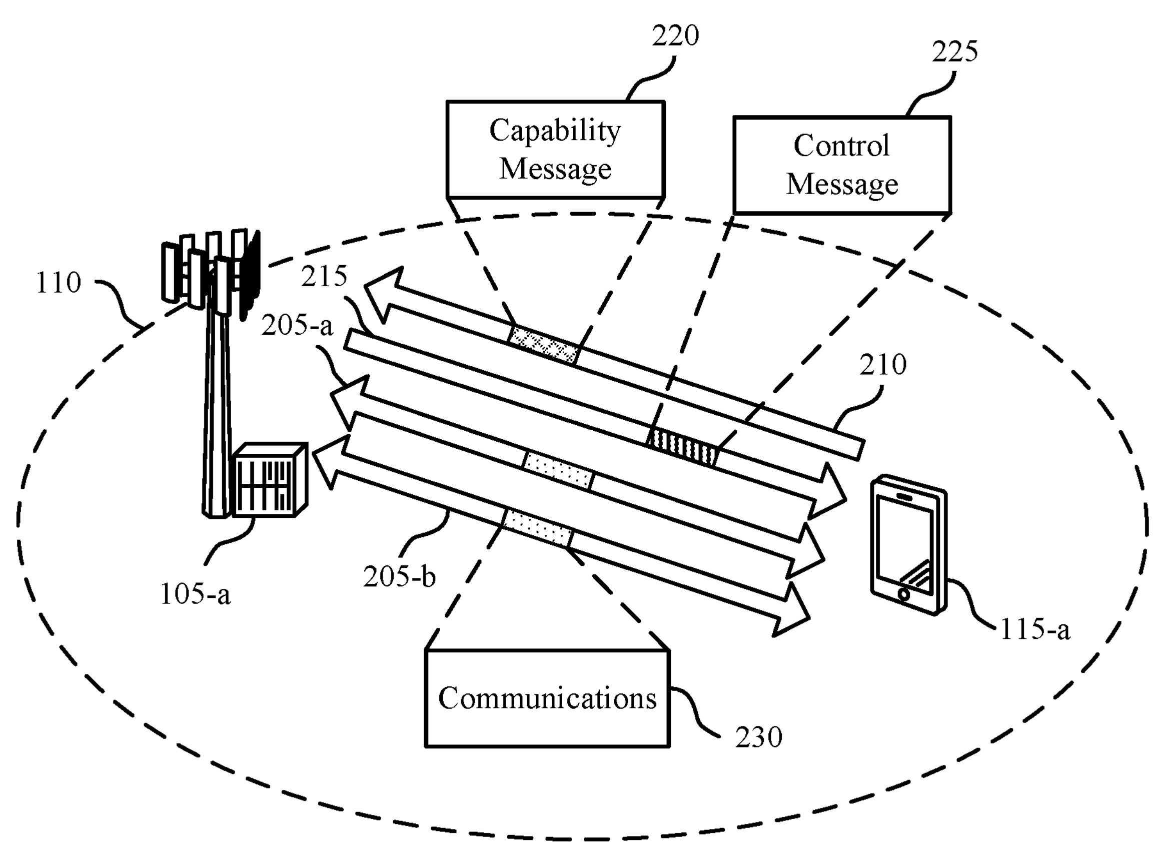
FIG. 2 illustrates an example of a wireless communications system that supports carrier switching with uplink carrier aggregation capability in accordance with aspects of the present disclosure.

FIG. 2 illustrates an example of a wireless communications system 200 that supports carrier switching with uplink carrier aggregation capability in accordance with aspects of the present disclosure. The wireless communications system 200 may implement some aspects of the wireless communications system 100. For example, the wireless communications system 200 may support communications between a network entity 105-*a* and a UE 115-*a* within a geographic coverage area 110. The network entity 105-*a* and the UE 115-*a* may be examples of a network entity 105 and a UE 115 as described with reference to FIG. 1. The UE 115-*a* may transmit uplink messages to the network entity 105-*a* over an uplink communication link 210, and the network entity 105-*a* may transmit downlink messages to the UE 115-*a* over a downlink communication link 215. The network entity 105-*a*, the UE 115-*a*, or both may additionally or alternatively transmit or receive the communications 230 over one or more component carriers 205 (e.g., the component carriers 205-*a* and 205-*b*).

The uplink communication link 210, the component carrier 205-*a*, the component carrier 205-*b*, or any combination thereof, may include one or more resources for a physical uplink channel such as a physical uplink control channel (PUCCH), a physical uplink shared channel (PUSCH), a physical random access channel (PRACH), or some other physical uplink channel. The downlink communication link 215, the component carrier 205-*a*, the component carrier 205-*b*, or any combination thereof, may include one or more resources for a physical downlink channel such as a physical downlink control channel (PDCCH), a physical downlink shared channel (PDSCH), a PRACH, a physical broadcast channel (PBCH), or some other physical downlink channel.

In some cases, a component carrier 205 may be configured to support one of uplink communications or downlink communications. Additionally or alternatively, a component carrier 205 may include resources to support both uplink and downlink communications (e.g., a TDD mode). For example, the network entity 105-*a* and the UE 115-*a* may transmit and receive the communications 230 (e.g., uplink and downlink communications 230) on each of the component carriers 205-*a* and 205-*b*.

The UE 115-*a* may support component carrier switching for uplink transmission. For example, the UE 115-*a* may transmit first uplink messages (e.g., PUCCH transmissions, PUSCH transmissions, PRACH transmissions, or some other uplink message) to the network entity 105-*a* on the first component carrier 205-*a*, and the UE 115-*a* may retune a transmit chain from the first component carrier 205-*a* to a second component carrier 205-*b* to transmit one or more second uplink messages to the network entity 105-*a* on the second component carrier 205-*b*. The UE 115-*a* may support uplink carrier switching if the UE 115-*a* is configured with more downlink chains than uplink chains on a component carrier 205 (e.g., for reciprocity in TDD bands). That is, in some examples, the UE 115-*a* may perform uplink carrier switching (e.g., SRS carrier switching, or other uplink carrier switching) if the UE 115-*a* is not configured with sufficient uplink carrier aggregation capability for simultaneous uplink transmissions on two or more component carriers 205.

The UE 115-*a* may transmit a UE capability message 220 to the network entity 105-*a* via the uplink communication link 210 to indicate whether the UE 115-*a* is capable of performing uplink carrier switching on the first and second component carriers 205-*a* and 205-*b*. If the UE 115-*a* indicates a capability to perform uplink carrier switching, the network entity 105-*a* may transmit the control message 225 via the downlink communication link 215 to indicate a configuration for the UE 115-*a* to perform uplink carrier switching for one or more scheduled uplink transmissions.

In some cases, the UE 115-*a* and the network entity 105-*a* may implement component carrier switching to communicate SRSs, which may be referred to as SRS carrier switching. In the example of the wireless communications system 200, the UE 115-*a* and the network entity 105-*a* may communicate over a first component carrier 205-*a* configured with more uplink chains than a second component carrier 205-*b*. To transmit an SRS to the network entity 105-*a*, the UE 115-*a* may retune from the first component carrier 205-*a* to the second component carrier 205-*b* and may transmit the SRS on the second component carrier 205-*b* in accordance with the uplink carrier switching configuration. The UE 115-*a* may thereby switch an uplink transmit chain corresponding to the uplink subframes on the first component carrier 205-*a* to the second component carrier 205-*b*. The network entity 105-*a* may measure the SRS transmitted by the UE 115-*a* to obtain CSI associated with the second component carrier 205-*b* (e.g., due to the TDD reciprocity). That is, the UE 115-*a* may temporarily switch component carriers 205 to transmit the SRS to the network entity 105-*a*, and the network entity 105-*a* may perform channel estimation based on the SRS to obtain CSI associated with the component carrier 205-*b*. The network entity 105-*a* may schedule subsequent downlink transmissions to the UE 115-*a* via the second component carrier 205-*b* based on the SRS. Additional details of the SRS carrier switching may be described in further detail elsewhere herein, including with reference to FIGS. 3 and 4.

In some examples, the UE 115-*a* may signal, via the UE capability message 220, that the UE 115-*a* supports uplink carrier aggregation on the first component carrier 205-*a* and the second component carrier 205-*b* (e.g., a given band combination) and that the UE 115-*a* supports uplink carrier switching for the same combination of the first component carrier 205-*a* and the second component carrier 205-*b*. If the UE 115-*a* supports uplink carrier aggregation on the first component carrier 205-*a* and the second component carrier 205-*b*, the UE 115-*a* may support simultaneous transmission of uplink messages on both of the component carriers 205-*a* and 205-*b*, and the UE 115-*a* may not benefit from uplink carrier switching. Accordingly, the network entity 105-*a* may receive the indication of the combined UE capabilities, and the network entity 105-*a* may determine whether to configure the UE 115-*a* to operate in the uplink carrier switching mode or the uplink carrier aggregation mode. In some cases, however, signaling for determining which mode to pick may be unclear. In one example, the network entity 105-*a* may configure, via the control message 225, the uplink carrier switching and disable the uplink carrier aggregation at the UE 115-*a* in response to the UE capability message 220. In another example, the network entity 105-*a* may configure the uplink carrier aggregation and disable the uplink carrier switching at the UE 115-*a* in response to the UE capability message 220. However, in some cases, uplink carrier aggregation may result in relatively large power consumption by the UE 115-*a*.

As described herein, the UE 115-*a* may indicate, via the capability message 220, whether the UE 115-*a* supports operation in an enhanced uplink carrier aggregation mode. The enhanced uplink carrier aggregation mode may correspond to transmission, by the UE 115-*a*, of a first uplink message on the first component carrier 205-*a* overlapping in time with transmission of a second uplink message on the second component carrier 205-*b*. Messages transmitted via resources that at least partially overlap in time may, in some examples, be referred to as overlapping, concurrent, simultaneous, or partially simultaneous transmissions. The transmission of the second uplink message in accordance with the enhanced uplink carrier aggregation mode may result in one or more interruption time gaps on the first component carrier 205-*a* (e.g., before or after the overlapping transmission of the first and second uplink messages). By signaling support of the enhanced uplink carrier aggregation mode, the UE 115-*a* may reduce latency and processing associated with performing uplink transmissions by the UE 115-*a* and scheduling the uplink transmissions by the network entity 105-*a*.

In some examples, the network entity 105-*a* may determine whether to configure the UE 115-*a* to operate in a carrier switching mode, a simultaneous transmission mode, the enhanced uplink carrier aggregation mode, or any combination thereof, based on the UE capability message 220. If the UE 115-*a* signals support of both uplink carrier aggregation and uplink carrier switching (e.g., SRS carrier switching), the network entity 105-*a* may indicate, via the control message 225, a configuration for the UE 115-*a* to perform overlapping uplink transmissions while operating in the enhanced uplink carrier aggregation mode. In some cases, the UE 115-*a* may indicate, via the UE capability message 220, whether the UE 115-*a* supports SRS carrier switching in connection with overlapping transmission (e.g., an additional UE capability may be signaled via the UE capability message 220). If the UE 115-*a* signals support for the SRS carrier switching in connection with overlapping transmission capability, the network entity 105-*a* may configure the UE 115-*a* to operate in the enhanced uplink carrier aggregation mode. If the UE 115-*a* does not signal support for the enhanced uplink carrier aggregation mode (e.g., if the UE 115-*a* supports uplink carrier switching but not uplink carrier aggregation, or if the UE 115-*a* does not support the uplink carrier switching in connection with overlapping transmission capability), the network entity 105-*a* may configure the UE 115-*a* to operate in an uplink switching mode (e.g., without simultaneous or concurrent transmissions).

In some examples, the UE 115-*a* may signal support for the enhanced uplink carrier aggregation mode on a per component carrier basis. The network entity 105-*a* may indicate, on a per component carrier basis, whether the UE 115-*a* is to operate in the enhanced uplink carrier aggregation mode. For example, the network entity 105-*a* may transmit a configuration bit per component carrier 205 to indicate a configuration for the enhanced uplink carrier aggregation mode.

In some examples, the UE 115-*a* may indicate, for one or both of the first component carrier 205-*a* or the second component carrier 205-*b*, whether the UE 115 is capable of transitioning a transmit chain associated with the respective component carrier 205 between a dormant mode and an active mode. If the UE 115-*a* supports uplink carrier aggregation, the UE 115-*a* may maintain a first transmit chain associated with the first component carrier 205-*a* and a second transmit chain associated with the second component carrier 205-*b*. The UE 115-*a* may signal, per component carrier 205, whether the UE 115-*a* supports a dormant transmit chain for the respective component carrier 205. If the UE 115-*a* supports a dormant transmit chain for the component carrier 205-*b* or the component carrier 205-*a*, the network entity 105-*a* may configure the UE 115-*a* to operate in the enhanced uplink carrier aggregation mode.

In some other examples, the UE 115-*a* may autonomously switch to operations in the enhanced uplink carrier aggregation mode (e.g., with or without receiving the control message 225). If the UE 115-*a* indicates a capability to support the enhanced uplink carrier aggregation mode, the UE 115-*a* may switch to operating the enhanced uplink carrier aggregation mode on the indicated component carrier or band. For example, If the UE 115-*a* supports both uplink carrier aggregation and uplink carrier switching (e.g., SRS carrier switching), SRS carrier switching in connection with overlapping transmission capability, a dormant transmit chain on a respective component carrier 205, or any combination thereof, the UE 115-*a* may indicate such support via the capability message 220 and autonomously switch to operating in the enhanced uplink carrier aggregation mode on the respective carrier or band. The network entity 105-*a* may determine, based on the UE capability message 220, that the UE 115-*a* will switch to operating in the enhanced uplink carrier aggregation mode. The network entity 105-*a* may or may not transmit the control message 225 to indicate the configuration for the UE 115-*a*.

While operating in the enhanced uplink carrier aggregation mode, the UE 115-*a* may operate a dormant transmit chain, such as a second transmit chain associated with the second component carrier 205-*b*, in a dormant mode prior to a scheduled transmission of an uplink message over the second component carrier 205-*b*. The UE 115-*a* may activate the second transmit chain during an interruption time gap. The interruption time gap may interrupt uplink transmissions by the UE 115-*a* on the first component carrier 205-*a*. The UE 115-*a* may operate, in accordance with the enhanced uplink carrier aggregation mode, the second transmit chain in the active mode while transmitting a first uplink message over the first component carrier 205-*a* and a second uplink message (e.g., the scheduled uplink message) over the second component carrier 205-*b* simultaneously or via resources that at least partially overlap in time in accordance with the enhanced uplink carrier aggregation mode. The UE 115-*a* may transition the second transmit chain from the active mode to the dormant mode during a second interruption time gap after transmitting the second uplink message. The UE 115-*a* may maintain the first transmit chain associated with the first component carrier 205-*a* in an active state while transitioning the second transmit chain to and from the active state.

Accordingly, the enhanced uplink carrier aggregation mode may provide for the UE 115-*a* to support uplink carrier aggregation for simultaneous or at least partially overlapping transmission of two or more uplink messages on the component carriers 205-*a* and 205-*b* while utilizing an uplink carrier switching framework to consume less power than if the UE 115-*a* operates in an uplink carrier aggregation mode without the enhancements for transmit chain deactivation. For example, if the UE 115-*a* maintains both the first and second transmit chains in the active state continuously, the UE 115-*a* may consume a relatively large amount of power, which may reduce a battery life of the UE 115-*a*. The enhanced uplink carrier aggregation mode is described in further detail elsewhere herein, including with reference to FIGS. 6 and 7.

Figure 3:
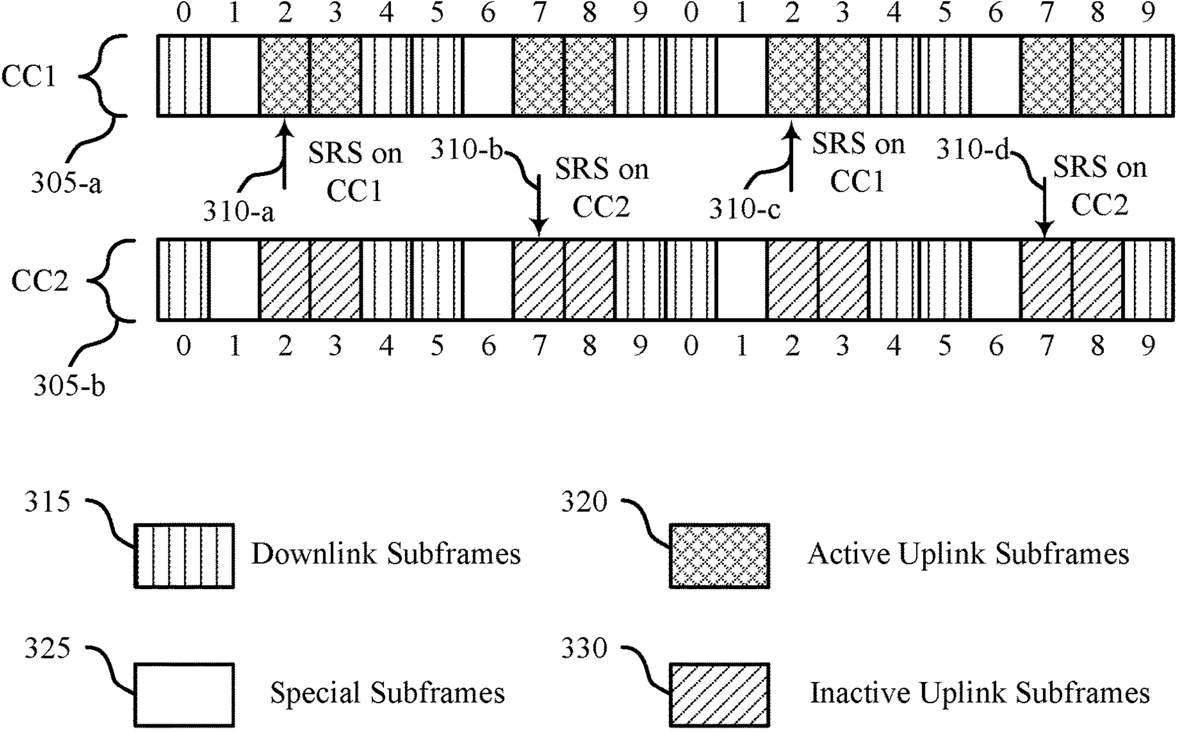
FIG. 3 illustrates an example of a component carrier configuration that supports carrier switching with uplink carrier aggregation capability in accordance with aspects of the present disclosure.

FIG. 3 illustrates an example of a component carrier configuration 300 that supports carrier switching with uplink carrier aggregation capability in accordance with aspects of the present disclosure. The component carrier configuration 300 may implement aspects of the wireless communications systems 100 and 200, as described with reference to FIGS. 1 and 2. For example, the component carrier configuration 300 may illustrate a configuration of a first component carrier 305-*a* (e.g., CC1) and a second component carrier 305-*b* (e.g., CC2) for uplink communications, downlink communications, or both between a UE 115 and a network entity 105. The UE 115 and the network entity 105 may represent examples of corresponding devices as described with reference to FIGS. 1 and 2. The component carriers 305 may represent examples of the component carriers 205 as described with reference to FIG. 2. In the example of the component carrier configuration 300, the UE 115 may support SRS carrier switching.

The UE 115 may support communications via the first component carrier 305-*a* (e.g., a primary component carrier 305-*a*), the second component carrier 305-*b* (e.g., a secondary component carrier 305-*b*), one or more other component carriers 305 (not pictured), or any combination thereof. The component carriers 305 may include one or more subframes in a time domain and one or more subchannels (not pictured) in a frequency domain. The subframes may include time and frequency resources allocated for uplink communications (e.g., the active uplink subframes 320), time and frequency resources allocated for downlink communications (e.g., the downlink subframes 315), time and frequency resources allocated for control signaling or other communications (e.g., the special subframes 325), or any combination thereof. In the example of the component carrier configuration 300, the first and second component carriers 305-*a* and 305-*b* may be configured to support uplink communications, downlink communications, or both. In some examples, such component carriers 305, frequency bands within such component carriers 305, or both may be referred to as TDD bands.

The UE 115 may be configured with downlink carrier aggregation over both the first component carrier 305-*a* and the second component carrier 305-*b*. That is, the UE 115 may receive downlink transmissions via both of the component carriers 305-*a* and 305-*b*. The UE 115 may support a first downlink chain associated with the first component carrier 305-*a* and a second downlink chain associated with the second component carrier 305-*b* (e.g., associated with contiguous or non-contiguous downlink subframes 315 within a respective component carrier 305). The first component carrier 305-*a* may be configured to support uplink communications. As such, the UE 115 may support a first uplink chain corresponding to the active uplink subframes 320 within the first component carrier 305-*a*, but the UE 115 may not support a second uplink chain associated with the second component carrier 305-*b* (e.g., the UE 115 may not include sufficient hardware to support simultaneous uplink chains corresponding to the first and second component carriers 305-*a* and 305-*b*).

If the UE 115 is configured with more downlink chains than uplink chains, the UE 115 may be configured to perform carrier switching for uplink transmissions. That is, the UE 115 may be configured to switch one or more of the uplink chains among the first and second component carriers 305-*a* and 305-*b*. In some examples, the UE 115 may perform carrier switching for SRS transmission. By performing SRS carrier switching, the UE 115 may support reciprocity in the TDD component carriers 305 (e.g., TDD bands). For example, the network entity 105 may utilize an SRS 310 received via the second component carrier 305-*b* to schedule subsequent downlink transmissions via the second component carrier 305-*b*.

In the example of the component carrier configuration 300, the UE 115 may switch transmission of the SRSs 310 between the first component carrier 305-*a* and the second component carrier 305-*b*. The UE 115 may transmit the SRS 310-*a* via one or more resources within the active uplink subframes 320 of the first component carrier 305-*a* (e.g., subframe 2, subframe 3, or both). The UE 115 may subsequently switch component carriers 305 and transmit the SRS 310-*b* via one or more resources within the inactive uplink subframes 330 of the second component carrier 305-*b* (e.g., subframe 7, subframe 8, or both). The UE 115 may switch the uplink chain from the first component carrier 305-*a* to the second component carrier 305-*b* to perform the transmission of the SRS 310-*b*. In some examples, the UE 115 may puncture PUSCH resources within the active uplink subframes 320 of the first component carrier 305-*a* to perform the transmission of the SRS 310-*b*. Additionally or alternatively, the UE 115 may drop one or more channels in the first component carrier 305-*a*, the second component carrier 305-*b*, or both, to perform the transmission of the SRS 310-*b* via the second component carrier 305-*b*. The UE 115 may subsequently switch back to the first component carrier 305-*a* and transmit the SRS 310-*c* via one or more resources in the active uplink subframes 320 of the first component carrier 305-*a* (e.g., subframe 2, subframe 3, or both). The UE 115 may repeat such carrier switching to transmit the SRS 310-*d* and one or more other SRSs 310.

Figure 4:
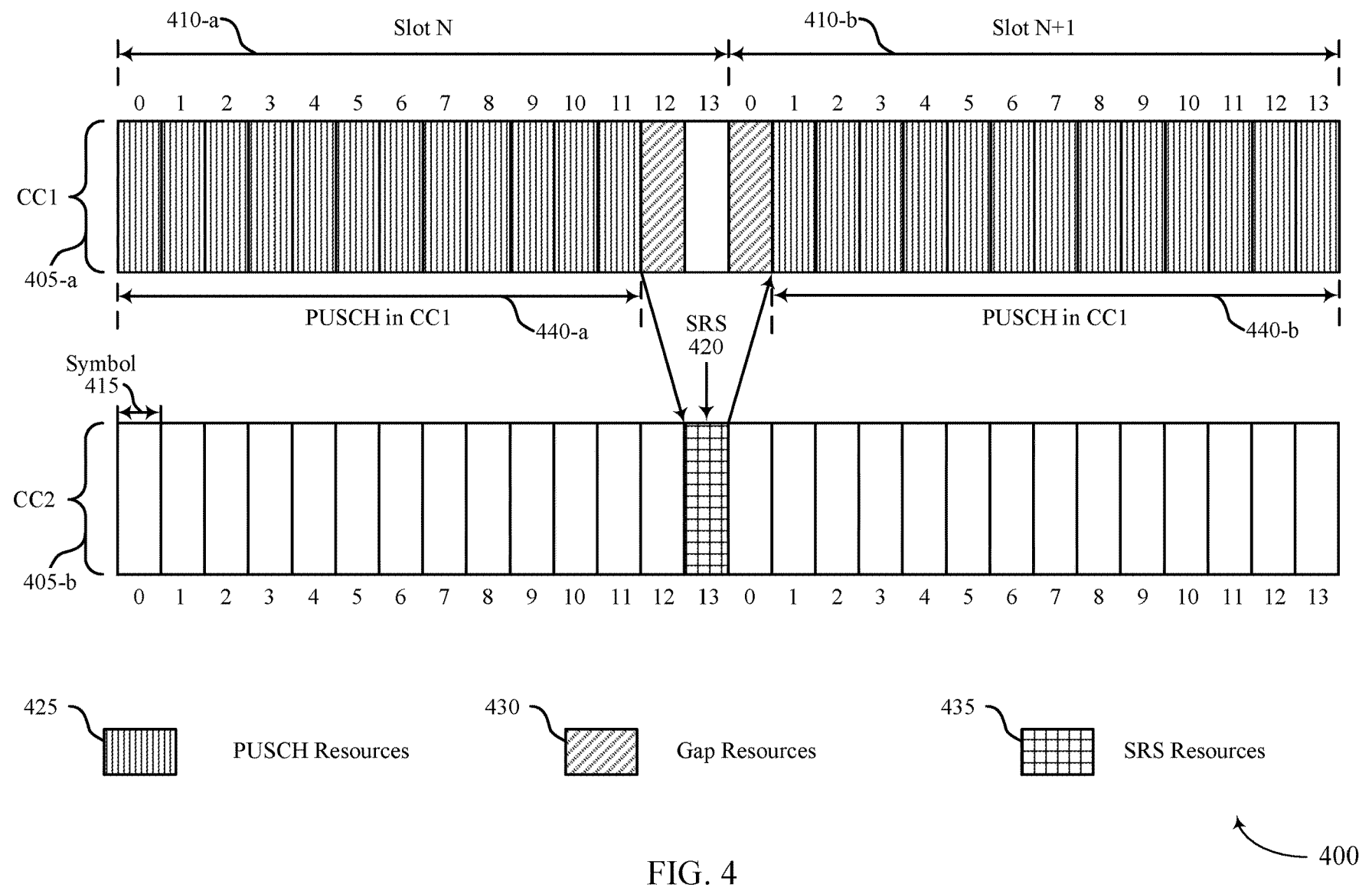

Such switching between component carriers 305 may be described in further detail elsewhere herein, including with reference to FIG. 4.

In some examples, the UE 115 may be configured to support uplink carrier aggregation between the first component carrier 305-*a* and the second component carrier 305-*b*. That is, the UE 115 may support transmission (e.g., two or more uplink chains) on the first component carrier 305-*a* and the second component carrier 305-*b* at the same time, or in at least partially overlapping time domain resources. In such cases, the second component carrier 305-*b* may include one or more active uplink subframes 320. To support the uplink transmissions on both component carriers 305, a first uplink transmit chain associated with the first component carrier 305-*a* and a second uplink transmit chain associated with the second component carrier 305-*b* may remain on (e.g., in an active state) such that the UE 115 may be prepared to transmit using either transmit chain after receiving a grant. However, the two or more transmit chains in the active state may result in relatively high power consumption at the UE 115.

To reduce power consumption while maintaining efficient communications, the UE 115 may be configured to operate in an enhanced uplink carrier aggregation mode to perform SRS transmission, or other uplink transmissions, as described with reference to FIG. 2. The enhanced uplink carrier aggregation mode is described in further detail elsewhere herein, including with reference to FIGS. 6 and 7.

FIG. 4 illustrates an example of a component carrier switching timeline 400 that supports carrier switching with uplink carrier aggregation capability in accordance with aspects of the present disclosure. The component carrier switching timeline 400 may implement aspects of the wireless communications systems 100 and 200, as described with reference to FIGS. 1 and 2 and the component carrier configuration 300, as described with reference to FIG. 3. For example, the component carrier switching timeline 400 may illustrate a timeline for a UE 115 to transmit uplink data to a network entity 105 via a first component carrier 405-*a*, a second component carrier 405-*b*, or both. The UE 115 and the network entity 105 may represent examples of corresponding devices as described with reference to FIGS. 1-3. In the example of the component carrier switching timeline 400, the UE 115 may be configured to support SRS carrier switching between the first component carrier 405-*a* and the second component carrier 405-*b*.

The UE 115 may be configured to communicate with the network entity 105 via the first component carrier 405-*a* (e.g., CC1) and the second component carrier 405-*b* (e.g., CC2). The first component carrier 405-*a* and the second component carrier 405-*b* may represent examples of the component carriers 305-*a* and 305-*b*, as described with reference to FIG. 3. In some examples, the first component carrier 405-*a*, the second component carrier 405-*b*, or both may support uplink and downlink communications (e.g., in a TDD mode). The component carrier switching timeline 400 illustrates resource allocations for the first and second component carriers 405-*a* and 405-*b* within slot 410-*a* (e.g., slot N), slot 410-*b* (e.g., slot N+1), and one or more symbols 415 within the slots 410-*a* and 410-*b*. The time and frequency resources within the slots 410, the symbols 415, and subchannels (not pictured in FIG. 4) may be allocated as the PUSCH resources 425, the gap resources 430, the SRS resources 435, or any combination thereof.

The UE 115 may be configured to transmit uplink data to the network entity 105 via the first component carrier 405-*a* for the durations 440-*a* and 440-*b* (e.g., via the resources allocated as the PUSCH resources 425 within symbols 0 through 11 of the slot 410-*a* and symbols 1 through 13 of the slot 410-*b*). Although not pictured in FIG. 4, it is understood that one or more resources on the second component carrier 405-*b* may be allocated for reception of downlink messages from the network entity 105, for transmission of uplink messages, or both, as illustrated in FIG. 3. The UE 115 may be scheduled to transmit an SRS 420 on the second component carrier 405-*b* during symbol 13 of the slot 410-*a* (e.g., or some other symbol 415 or slot 410).

In the example of the component carrier switching timeline 400, the UE 115 may not support uplink carrier aggregation on the first and second component carriers 405-*a* and 405-*b*. For example, the UE 115 may not be configured with sufficient uplink carrier aggregation capability to perform simultaneous transmission on both of the component carriers 405. The UE 115 may transmit an indication of the capability of the UE 115 to a network entity 105. For example, the UE 115 may indicate that the UE 115 does not support operations in the enhanced uplink carrier aggregation mode, as described with reference to FIG. 2. In some examples, the UE 115 may signal that the UE 115 supports SRS carrier switching between the first component carrier 405-*a* and the second component carrier 405-*b* but does not support uplink carrier aggregation in the same combination of component carriers 405. Additionally or alternatively, the UE 115 may signal that the UE 115 does not support SRS carrier switching and simultaneous transmission (e.g., an additional UE capability). The network entity 105 may receive the indication of the UE capability, and the network entity 105 may configure the UE 115 to perform carrier switching for transmission of the SRS 420 (e.g., no simultaneous transmission may be configured for the UE 115).

The UE 115 may switch an uplink chain associated with the first component carrier 405-*a* to the second component carrier 405-*b* for transmission of the SRS 420 on the second component carrier 405-*b* in accordance with the SRS carrier switching configuration. In some examples, the UE 115 may puncture the PUSCH resources 425 on the first component carrier 405-*a* to perform the SRS transmission on the second component carrier 405-*b*. In some examples, the UE 115 may be configured with a set of rules for dropping channels in the first component carrier 405-*a*, the second component carrier 405-*b*, or both, to perform carrier switching.

To perform the carrier switching, the UE 115 may retune from the first component carrier 405-*a* to the second component carrier 405-*b*. The retuning may interrupt the uplink transmissions by the UE 115 on the first component carrier 405-*a*. For example, the gap resources 430 may be allocated within symbol 12 of the slot 410-*a* on the first component carrier 405-*a* to provide time for the UE 115 to perform the retuning. The UE 115 may transmit the SRS 420 on the second component carrier 405-*b* after retuning to the second component carrier 405-*b*. The UE 115 may not transmit uplink messages on the first component carrier 405-*a* while transmitting the SRS 420 on the second component carrier 405-*b* (e.g., the resources in symbol 13 of slot 410-*a* on the first component carrier 405-*a* may be empty resources). The UE 115 may subsequently retune back to the first component carrier 405-*a*, which may provide a second interruption to the uplink transmissions by the UE 115 on the first component carrier 405-*a*. The gap resources 430 may be allocated within symbol 0 of the slot 410-*b* to provide time for the UE 115 to perform the retuning. In some examples, the gap resources 430 may be null resources. The time and frequency resources in symbol 13 of the slot 410-*a* on the first component carrier 405-*a* may additionally or alternatively include null resources (e.g., empty resources).

Accordingly, if the UE 115 does not indicate support of the enhanced uplink carrier aggregation mode, the UE 115 may be configured to perform carrier switching to transmit an SRS 420, or other uplink messages, as illustrated by the component carrier switching timeline 400. The enhanced uplink carrier aggregation mode as described herein may provide for the UE 115 to support uplink transmission in overlapping resources, such as in the slot 13 on, on two or more component carriers 405, as described in further detail with reference to FIGS. 5-7.

Figure 5:
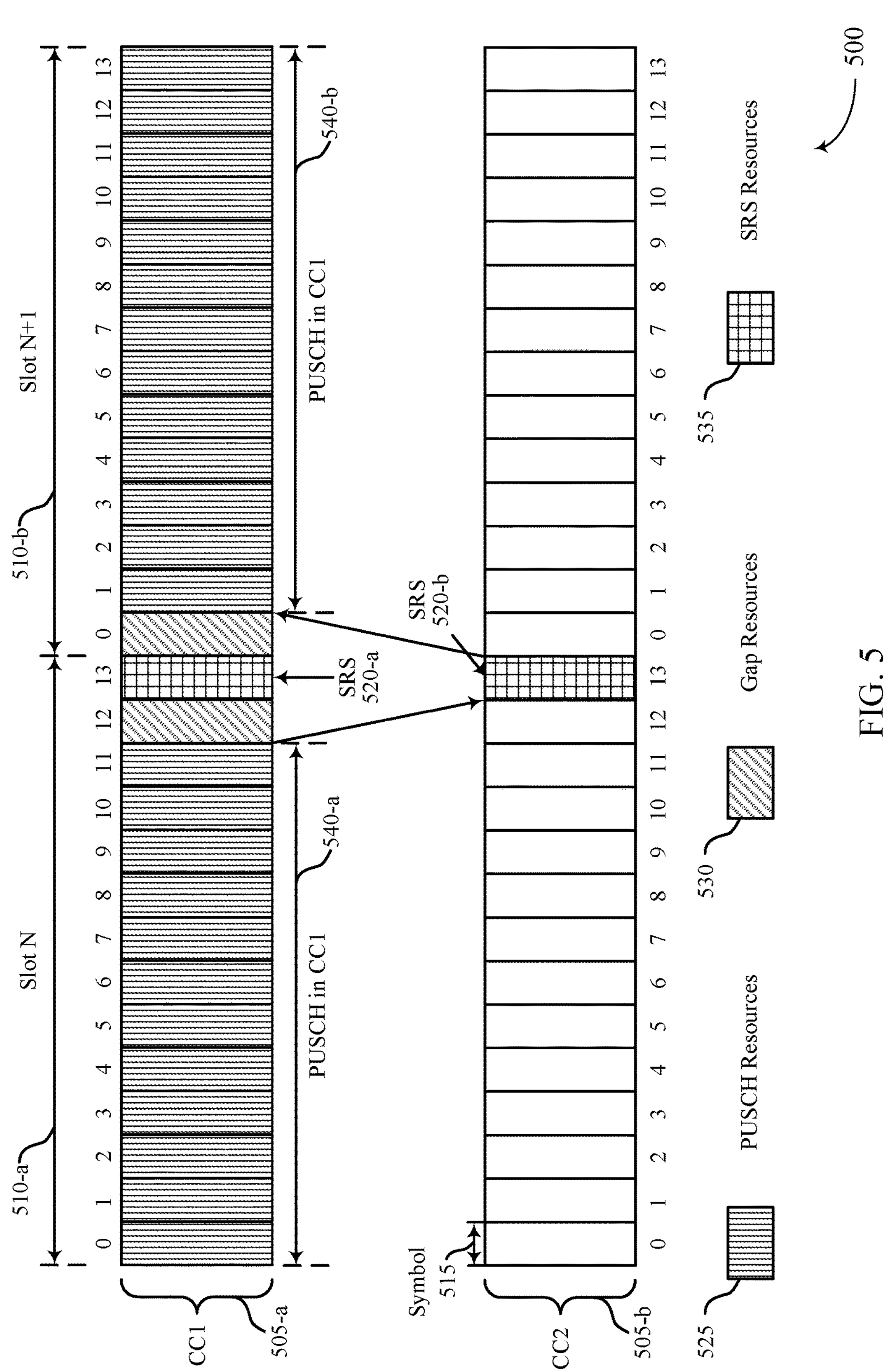
FIG. 5 illustrates an example of a component carrier switching timeline that supports carrier switching with uplink carrier aggregation capability in accordance with aspects of the present disclosure.

FIG. 5 illustrates an example of a component carrier switching timeline 500 that supports carrier switching with uplink carrier aggregation capability in accordance with aspects of the present disclosure. The component carrier switching timeline 500 may implement aspects of the component carrier switching timeline 400, as described with reference to FIG. 4, and the wireless communications systems 100 and 200, as described with reference to FIGS. 1 and 2. For example, the component carrier switching timeline 500 may illustrate a timeline for a UE 115 to transmit uplink data to a network entity 105 via a first component carrier 505-*a*, a second component carrier 505-*b*, or both. The first and second component carriers 505-*a* and 505-*b* may be examples of the component carriers described with reference to FIGS. 2-4. In the example of the component carrier switching timeline 500, the UE 115 may be configured to support uplink carrier aggregation, SRS carrier switching, or both, on the first component carrier 505-*a* and the second component carrier 505-*b*.

The component carrier switching timeline 500 illustrates resource allocations for the first and second component carriers 505-*a* and 505-*b* within a slot 510-*a* (e.g., slot N), a slot 510-*b* (e.g., slot N+1), and one or more symbols 515 within the slots 510-*a* and 510-*b*. The UE 115 may be configured to perform uplink transmissions on the first component carrier 505-*a* during the durations 540-*a* and 540-*b* (e.g., symbols 0 through 13 of the slot 510-*a* and symbols 1 through 13 of the slot 510-*b* may include resources allocated as the PUSCH resources 525). The UE 115 may be scheduled to transmit an SRS 520 during symbol 13 of the slot 510-*a*. In some examples, the UE 115 may transmit a UE capability message to a network entity 105 to indicate a capability of the UE 115, and the network entity 105 may configure the UE 115 to transmit the SRS 520 on the first component carrier 505-*a*, the second component carrier 505-*b*, or both, based on the capability of the UE 115.

In the example of the component carrier switching timeline 500, the UE 115 may transmit the capability message indicating that the UE 115 supports operation in an enhanced uplink carrier aggregation mode, as described with reference to FIGS. 2-4. The UE 115 may signal support for the enhanced uplink carrier aggregation mode on a per component carrier basis. In some other cases, the UE may signal support for the enhanced uplink carrier aggregation on a per band basis, or per band of band combination basis. The network entity 105 may, in some examples, indicate, per component carrier 505, per band, or per band of band combination, whether the UE 115 is to operate in the enhanced uplink carrier aggregation mode. As described with reference to FIG. 2, the UE 115 may indicate, per component carrier 505 (e.g., or per band combination), whether the UE 115 is capable of transitioning a transmit chain associated with the component carrier 505 between a dormant mode and an active mode. In some examples, the UE 115 may transmit the capability message signaling support for both uplink carrier aggregation and SRS carrier switching, and the network entity 105 may determine that the UE 115 supports operations in the enhanced uplink carrier aggregation mode based on the combination of capabilities. Additionally or alternatively, the UE 115 may transmit the capability message indicating support for simultaneous transmission in connection with SRS carrier switching, and the network entity 105 may determine that the UE 115 supports operations in the enhanced uplink carrier aggregation mode based on the UE capability.

The network entity 105 may configure the UE 115 to operate in the enhanced uplink carrier aggregation mode accordingly. Additionally or alternatively, the UE 115 may autonomously switch to operating in the enhanced uplink carrier aggregation mode (e.g., without signaling from the network entity 105). While operating in the enhanced uplink carrier aggregation mode, the UE 115 may transmit a first SRS 520-*a* via the first component carrier 505-*a* and a second SRS 520-*b* via the second component carrier 505-*b*, where the transmission of the first SRS 520-*a* and the transmission of the second SRS 520-*b* are at least partially overlapping in time, as illustrated in the component carrier switching timeline 500. For example, the first and second SRSs 520 may be transmitted via at least some of the SRS resources 535 in symbol 13 of the slot 410-*a* on the first and second component carriers 505-*a* and 505-*b*.

The UE 115 may transmit the SRS 520-*a* and the SRS 520-*b* using a framework similar to the SRS carrier switching framework illustrated in FIGS. 3 and 4. For example, the resources in symbol 12 of the slot 510-*a* and symbol 0 of the slot 510-*b* on the first component carrier 505-*a* may be allocated as the gap resources 530 to provide an interruption time. However, the resources in symbol 13 of the slot 510-*a* on the first component carrier 505-*a* may be allocated as SRS resources 535 (e.g., instead of empty resources as illustrated in FIG. 4).

The interruption time gap in the example of the component carrier switching timeline 500 may provide an interruption time for the UE 115 to retune component carriers 505, to turn on an uplink transmit chain corresponding to the second component carrier 505-*b*, or both. That is, in some examples, instead of interrupting the uplink transmissions on the first component carrier 505-*a* to retune an uplink chain between the first component carrier 505-*a* and the second component carrier 505-*b*, the UE 115 may interrupt the uplink transmissions on the first component carrier 505-*a* to activate or deactivate an uplink transmit chain associated with the second component carrier 505-*b*. Techniques for activating and deactivating uplink transmit chains are described in further detail elsewhere herein, including with reference to FIGS. 6 and 7.

Figure 6:
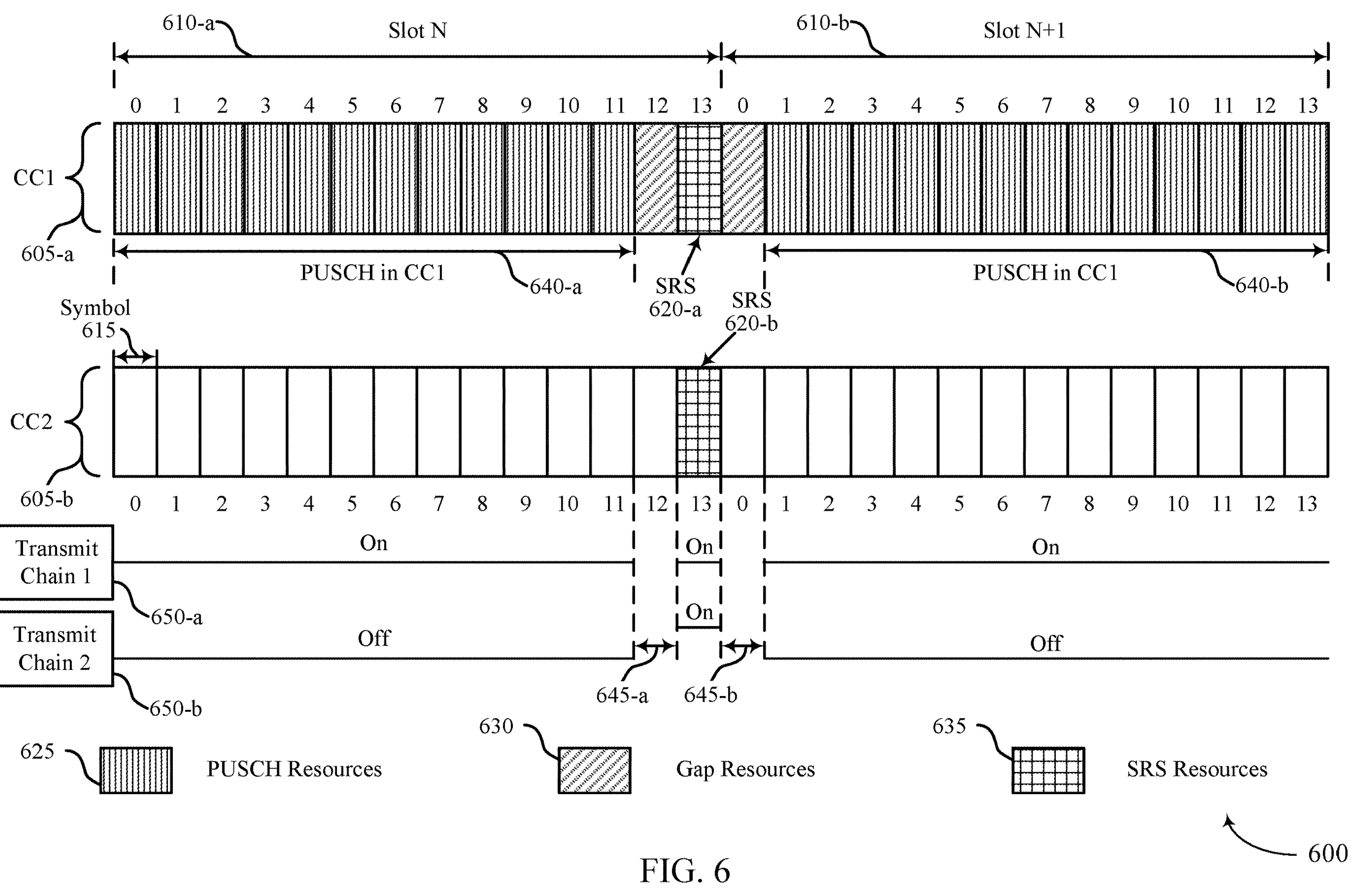
FIG. 6 illustrates an example of a component carrier activation timeline that supports carrier switching with uplink carrier aggregation capability in accordance with aspects of the present disclosure.

FIG. 6 illustrates an example of a component carrier activation timeline 600 that supports carrier switching with uplink carrier aggregation capability in accordance with aspects of the present disclosure. The component carrier activation timeline 600 may implement aspects of the component carrier switching timeline 500, as described with reference to FIG. 5, and the wireless communications systems 100 and 200, as described with reference to FIGS. 1 and 2. For example, the component carrier activation timeline 600 may illustrate a timeline for a UE 115 to transmit uplink data to a network entity 105 via a first component carrier 605-*a*, a second component carrier 605-*b*, or both. The first and second component carriers 605-*a* and 605-*b* may be examples of the component carriers described with reference to FIGS. 2-5. In the example of the component carrier activation timeline 600, the UE 115 may be configured to support operations in an enhanced uplink carrier switching mode.

The UE 115 may support communications via the first component carrier 605-*a* (e.g., CC1) and the second component carrier 605-*b* (e.g., CC2). The component carrier activation timeline 600 illustrates resource allocations for the first and second component carriers 605-*a* and 605-*b* within a slot 610-*a* (e.g., slot N), a slot 610-*b* (e.g., slot N+1), and one or more symbols 615 within the slots 610-*a* and 610-*b*. The UE 115 may support a first transmit chain 650-*a* (e.g., transmit chain 1) for the first component carrier 605-*a* and a second transmit chain 650-*b* (e.g., transmit chain 2) for the second component carrier 605-*b*. The UE 115 may be scheduled to transmit one or more SRSs 620 via the first component carrier 605-*a*, the second component carrier 605-*b*, or both during symbol 13 of the slot 610-*a* based on a capability of the UE 115. In some cases, as described with reference to FIGS. 1-5, the UE 115 may transmit a UE capability message to the network entity 105 to indicate whether the UE 115 supports operation in an enhanced uplink carrier aggregation mode.

In the example of the component carrier activation timeline 600, the UE 115 may signal, per component carrier 605 (e.g., or per uplink band of the configured uplink band combination), whether the UE 115 supports a dormant transmit chain 650, such as the dormant transmit chain 650-*b*. If the UE 115 supports a dormant transmit chain 650 on a component carrier 605, the UE 115 may be capable of transitioning the dormant transmit chain 650 between a dormant mode and an active mode. That is, by signaling whether the UE 115 is capable of transitioning the dormant chain 650, the UE 115 may indicate whether the UE 115 supports operations in the enhanced uplink carrier aggregation mode. The UE 115 may additionally or alternatively indicate a duration of an interruption time gap 645 associated with the dormant transmit chain 650. In some examples, the UE 115 may indicate which component carrier(s) 605 are interrupted by the interruption time gap 645. In the example of the component carrier activation timeline 600, the UE 115 may signal a capability of the UE 115 to transition the transmit chain 650-*b* associated with the second component carrier 605-*b* between the dormant mode and the active mode. The UE 115 may indicate a duration of the interruption time gaps 645-*a* and 645-*b* for transitioning between the active mode and the dormant mode.

The UE 115 may operate in the enhanced uplink carrier aggregation mode based on the UE capabilities. The UE 115 may operate in the enhanced uplink carrier aggregation mode autonomously, or the network entity 105 may receive the indication of the UE capability, and the network entity 105 may configure the UE 115 to operate in the enhanced uplink carrier aggregation mode accordingly, as described with reference to FIGS. 2-5.

In some examples, the network entity 105 may transmit an indication of the configuration for the enhanced uplink carrier aggregation mode via a configuration bit per component carrier 605 (e.g., a bit may be added to a component carrier configuration) to indicate whether the component carrier 605 is in a dormant mode or not. During a dormant mode for the component carrier 605-*b*, the transmit chain 650-*b* corresponding to the component carrier 605-*b* may operate in a dormant mode (e.g., turn off). During an uplink carrier aggregation mode, the transmit chain 650-*b* may transition to an active state (e.g., turn on). The UE 115 may continuously operate the transmit chain 650-*a* corresponding to the first component carrier 605-*a* in an active state.

In the example of the enhanced uplink carrier aggregation mode illustrated in the component carrier activation timeline 600, the UE 115 may activate or deactivate the second transmit chain 650-*b* during the interruption time gaps 645-*a* and 645-*b*, respectively (e.g., the interruption time gaps 645 may be a glitch due to turning on and off the transmit chain 650-*b*, instead of a switching time for retuning before component carriers 605, as described with reference to FIG. 4). As such, the gap resources 630 may be allocated within the symbol 12 of the slot 610-*a* and the symbol 0 of the slot 610-*b* to provide for the UE 115 to turn on and off the transmit chain 650-*b* before and after transmitting the SRSs 620-*a* and 620-*b*.

Accordingly, in the example of the component carrier activation timeline 600, the UE 115 may operate the transmit chain 650-*b* associated with the second component carrier 605-*b* in a dormant mode (e.g., an off state) for the duration 640-*a* while the UE 115 transmits uplink data over the first component carrier 605-*a* (e.g., symbols 0 through 11 of the slot 610-*a* may include resources allocated as the PUSCH resources 625). The UE 115 may activate the transmit chain 650-*b* during the interruption time gap 645-*a* prior to the scheduled transmission of the SRSs 620-*a* and 620-*b* in symbol 13 of the slot 410-*a*. The activation of the transmit chain 650-*b* may interrupt the uplink transmissions by the UE 115 on the first component carrier 605-*a* (e.g., the resources in symbol 12 of the slot 610-*a* on the first component carrier 605-*a* may include the gap resources 630). The UE 115 may transmit the SRS 620-*a* and the SRS 620-*b* via the SRS resources 635 allocated within the symbol 13 of the slot 610-*a* on the first component carrier 605-*a* and the second component carrier 605-*b*, respectively in accordance with the enhanced uplink carrier aggregation mode. Both the first transmit chain 650-*a* and the second transmit chain 650-*b* may operate in the active state while the UE 115 transmits the SRSs 620-*a* and 620-*b*.

After transmitting the SRSs 620-*a* and 620-*b*, the UE 115 may transition the transmit chain 650-*b* from the active mode to the dormant mode during the interruption time gap 645-*b*. The deactivation of the transmit chain 650-*b* may interrupt the uplink communications on the first component carrier 605-*a* (e.g., the resources in symbol 0 of the slot 410-*b* on the first component carrier 605-*a* may include the gap resources 630). The UE 115 may transmit uplink data on the first component carrier 605-*a* for the duration 640-*b* (e.g., symbols 1 through 13 of the slot 610-*b* may include the PUSCH resources 625).

The UE 115 may thereby support operations in the enhanced uplink carrier aggregation mode according to the component carrier activation timeline 600. While operating in the enhanced uplink carrier aggregation mode, the UE 115 may perform simultaneous transmission of SRSs 620, or other uplink messages or signals, via the first component carrier 605-*a* and the second component carrier 605-*b* according to an uplink carrier aggregation mode, and the UE 115 may utilize uplink carrier switching framework to activate and deactivate at least one transmit chain associated with the second component carrier 605-*b* prior to and subsequent to the uplink transmissions to reduce power consumption by the UE 115.

Figure 7:
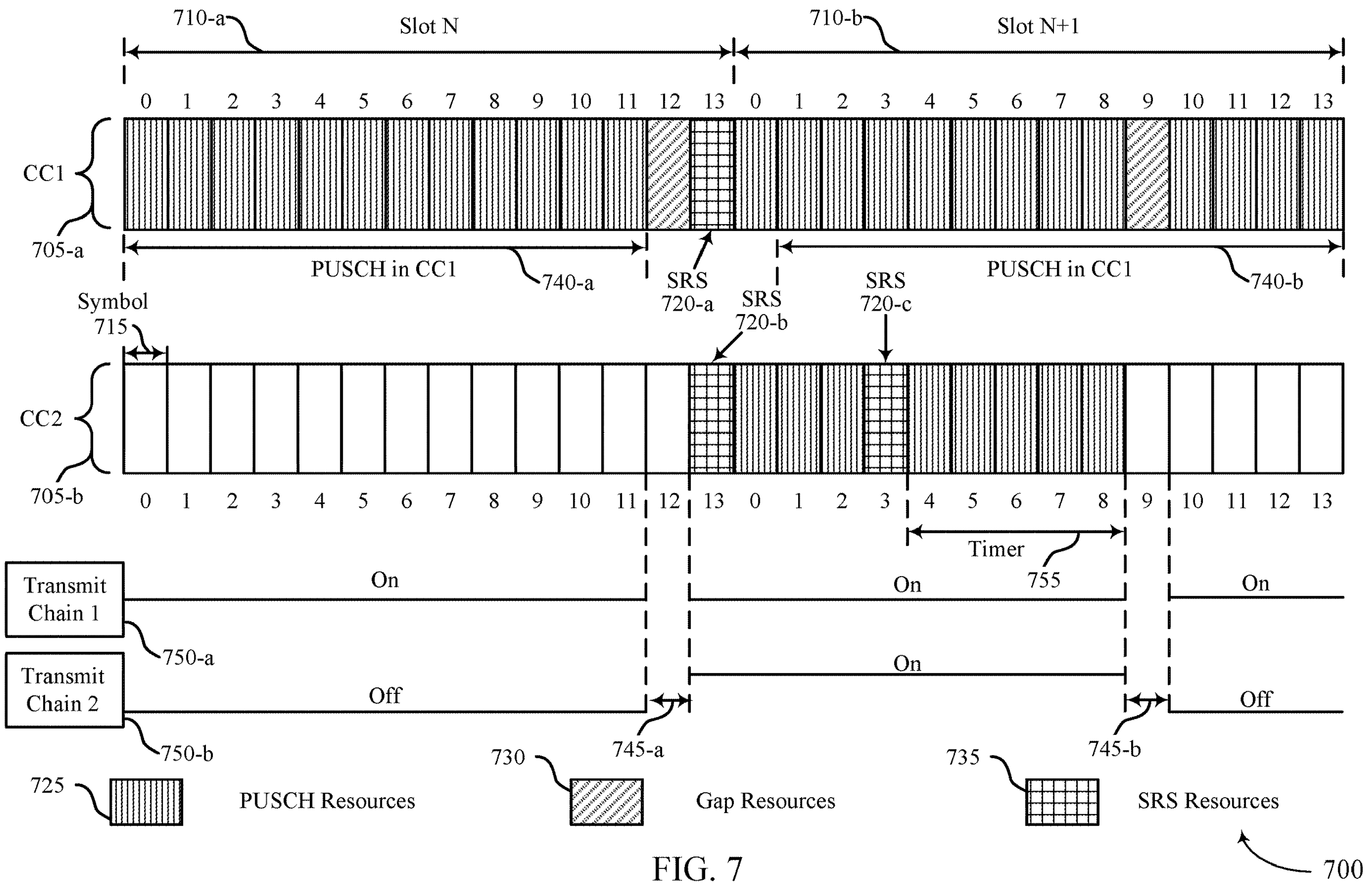
FIG. 7 illustrates an example of a component carrier activation timeline that supports carrier switching with uplink carrier aggregation capability in accordance with aspects of the present disclosure.

FIG. 7 illustrates an example of a component carrier activation timeline 700 that supports carrier switching with uplink carrier aggregation capability in accordance with aspects of the present disclosure. The component carrier activation timeline 700 may implement aspects of the component carrier activation timeline 600, as described with reference to FIG. 6, and the wireless communications systems 100 and 200, as described with reference to FIGS. 1 and 2. For example, the component carrier activation timeline 700 may illustrate a timeline for a UE 115 to transmit uplink data to a network entity 105 via a first component carrier 705-*a*, a second component carrier 705-*b*, or both. The first and second component carriers 705-*a* and 705-*b* may be examples of the component carriers described with reference to FIGS. 2-6. In the example of the component carrier activation timeline 700, the UE 115 may initiate a timer 755 while operating in an enhanced uplink carrier aggregation mode to reduce power consumption.

The UE 115 may be configured with the first component carrier 705-*a* (e.g., CC1) and the second component carrier 705-*b* (e.g., CC2). The UE 115 may support a first transmit chain 750-*a* (e.g., transmit chain 1) associated with the first component carrier 705-*a* and a second transmit chain 750-*b* (e.g., transmit chain 2) associated with the second component carrier 705-*b*. The UE 115 may be scheduled to transmit one or more SRSs 720 via the first component carrier 705-*a*, the second component carrier 705-*b*, or both (e.g., based on a capability of the UE 115).

As described with reference to FIG. 6, the UE 115 may signal, per component carrier 705 (e.g., or per uplink band of the configured uplink band combination), whether the UE 115 supports the enhanced uplink carrier aggregation mode. For example, the UE 115 may signal, for the component carrier 705-*b*, that the UE 115 is capable of transitioning the transmit chain 750-*b* (e.g., a dormant transmit chain 750-*b*) between a dormant mode and an active mode. The UE 115 may signal a duration of the interruption time gaps 745-*a* and 745-*b* for activating and deactivating the transmit chain 750-*b*.

The UE 115 may switch to operating in the enhanced uplink carrier aggregation mode based on the UE capabilities. The UE 115 may switch to the enhanced uplink carrier aggregation mode or based on an indication from the network entity 105. For example, the network entity 105 may receive the indication of the UE capability to support the enhanced uplink carrier aggregation mode, and the network entity 105 may transmit a control message indicating a configuration for the UE to operate in the enhanced uplink carrier aggregation mode accordingly. The configuration may indicate, for each of the component carriers 705-*a* and 705-*b*, whether the UE 115 is to operate in the enhanced uplink carrier aggregation mode. In some examples, the network entity 105 may transmit a configuration bit per component carrier 705 to indicate whether the respective component carrier 705 is in a dormant mode or not (e.g., a bit may be added to a component carrier configuration). During a dormant mode for the component carrier 705-*b*, the transmit chain 750-*b* corresponding to the component carrier 705-*b* may operate in a dormant mode. The transmit chain 750-*b* may transition to an active state during an uplink carrier aggregation mode. The UE 115 may operate the transmit chain 750-*a* corresponding to the first component carrier 705-*a* in an active state continuously.

In the example of the component carrier activation timeline 700, the UE 115 may deactivate (e.g., turn off) the dormant transmit chain 750-*b* corresponding to the second component carrier 705-*b* for the duration 740-*a* while the UE 115 transmits uplink data on the first component carrier 705-*a* (e.g., symbols 0 through 11 of the slot 710-*a* may be allocated as the PUSCH resources 725). The UE 115 may transition the transmit chain 750-*b* from the dormant state to the active state during the interruption time gap 745-*a* in preparation for the scheduled transmissions of the SRSs 720-*a* and 720-*b* (e.g., during symbol 13 of the slot 710-*b*, which may include the SRS resources 735). The resources in symbol 12 of the slot 710-*b* may be allocated as the gap resources 730 to provide for the interruption time gap 745-*a*.

The UE 115 may transmit the SRS 720-*a* and the SRS 720-*b* via the SRS resources 735 allocated within the symbol 13 of the slot 710-*a* on the first component carrier 705-*a* and the second component carrier 705-*b*, respectively. The UE 115 may transmit the SRSs 720-*a* and 720-*b* in accordance with the enhanced uplink carrier aggregation mode. Both the first transmit chain 750-*a* associated with the first component carrier 705-*a* and the second transmit chain 750-*b* associated with the second component carrier 705-*b* may operate in the active state while the UE 115 transmits the SRSs 720-*a* and 720-*b*.

The UE 115 may be configured with a timer 755 for operations according to the enhanced uplink carrier aggregation mode. The timer 755 may be configured by a network entity 105 (e.g., via a RRC configuration). Instead of turning off the dormant transmit chain 750-*b* after transmitting the SRSs 720-*a* and 720-*b*, the UE 115 may initiate the timer 755. In the example of the component carrier activation timeline 700, a duration of the timer 755 may be five symbols 715. The UE 115 may transmit scheduled SRSs 720 or other uplink messages via the PUSCH resources 725 allocated within the symbols 0 through 2 and/or symbols 4 through 8 of the slot 710-*b* on the second component carrier 705-*b*. The UE 115 may reset the timer 755 each time the UE 115 performs a scheduled transmission.

In the example of FIG. 7, the UE 115 may be scheduled to transmit an SRS 720-*c* on the second component carrier 705-*b* after the SRS 720-*b* (e.g., in symbol 3 of the slot 710-*b*). As such, the UE 115 may transmit the SRS 720-*c* before the timer 755 expires, and the UE 115 may restart the timer 755 after transmitting the SRS 720-*c* on the second component carrier. The UE 115 may continue to reset the timer 755 and maintain the transmit chain 750-*b* in the active state as long as the UE 115 is scheduled to perform SRS transmissions, or other uplink transmissions, prior to an expiration of the timer 755. In some examples, the UE 115 may perform uplink transmissions on the second component carrier 705-*b* via the PUSCH resources 725 during the duration 740-*b* (e.g., symbols 0 through 8 of the slot 710-*b*) before the timer 755 expires. As such, in some examples, the UE 115 may transmit the SRS 720-*c* or other uplink messages on the second component carrier 705-*b* while the UE 115 simultaneously transmits uplink data via the PUSCH resources 725 on the first component carrier 705-*a*.

In the example of FIG. 7, the timer 755 may expire at the end of symbol 8 in the slot 710-*b* (e.g., the UE 115 may not perform any uplink transmission for at least five symbols after transmitting the SRS 720-*c*). The UE 115 may deactivate the transmit chain 750-*b* in response to the expiration of the timer 755 and during the interruption time gap 745-*b*. The deactivation of the transmit chain 750-*b* on the second component carrier 705-*b* may interrupt the uplink communications on the first component carrier 705-*a*. Accordingly, the resources in symbol 9 of the slot 710-*b* on the first component carrier 705-*a* may be allocated as the gap resources 730. After the transmit chain 750-*b* is deactivated, the UE 115 may continue to transmit uplink data on the first component carrier 705-*a* for the remainder of the duration 740-*b* (e.g., resources in symbols 10 through 13 of the slot 710-*b* may be allocated as the PUSCH resources 725).

Accordingly, the UE 115 may run a timer 755 while performing enhanced uplink carrier aggregation to reduce power consumption and improve reliability associated with uplink transmission. Although not illustrated in FIG. 7, it is to be understood that the UE 115 may apply the enhanced uplink carrier aggregation mode, the timer 755, or both, to any uplink transmissions or any uplink channels (e.g., PUSCH, PUCCH, PRACH, or other uplink channels). The enhanced uplink carrier aggregation mode may provide for the UE 115 to reduce power consumption while performing at least some uplink transmissions on two or more component carriers 705.

Figure 8:
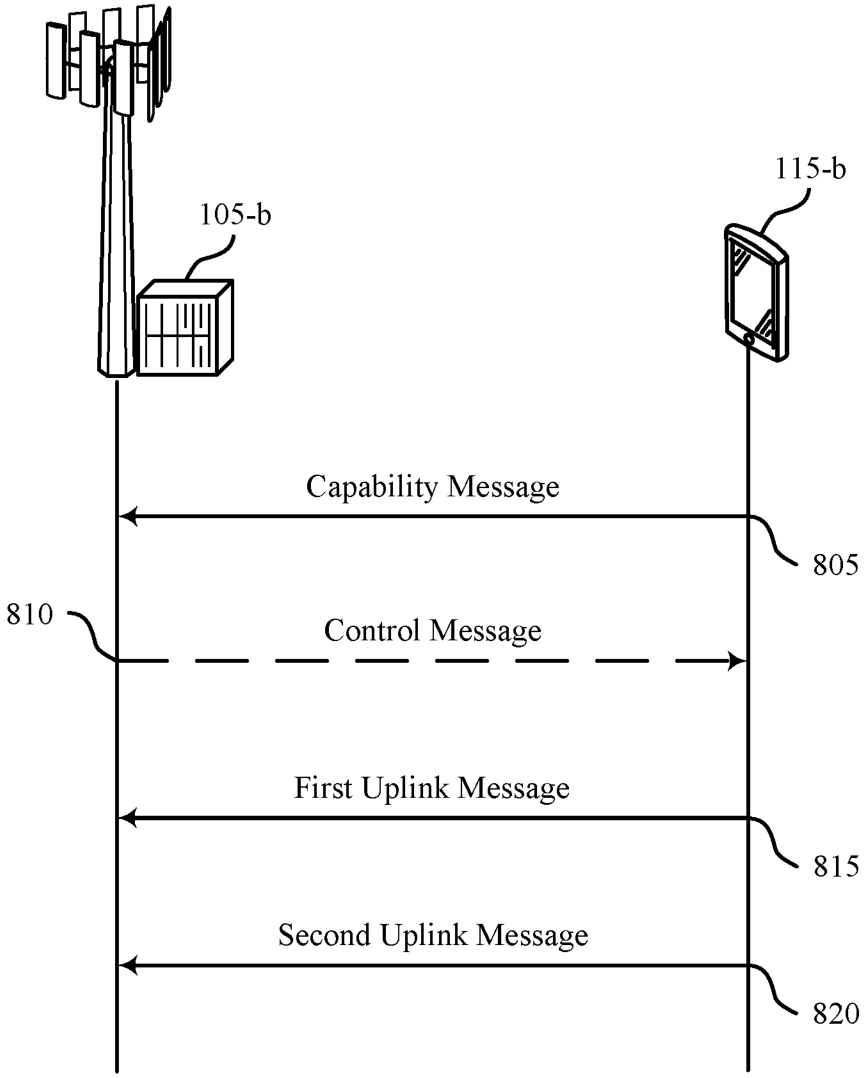
FIG. 8 illustrates an example of a process flow that supports carrier switching with uplink carrier aggregation capability in accordance with aspects of the present disclosure.

FIG. 8 illustrates an example of a process flow 800 that supports carrier switching with uplink carrier aggregation capability in accordance with aspects of the present disclosure. The process flow 800 may implement or be implemented by some aspects of the wireless communications system 100 or 200. For example, the process flow 800 may include a UE 115-*b* and a network entity 105-*b*, which may be examples of a UE 115 and a network entity 105 as described with reference to FIGS. 1-7. In some examples, the UE 115-*b* may support operations in an enhanced uplink carrier aggregation mode.

It is understood that the devices and nodes described by the process flow 800 may communicate with or be coupled with other devices or nodes that are not illustrated. For example, the UE 115-*b* and the network entity 105-*b* may communicate with one or more other UEs 115, network entities 105, or other devices. Alternative examples of the following may be implemented, where some steps are performed in a different order than described or are not performed at all. In some cases, a step may include additional features not mentioned below, or further steps may be added.

At 805, the UE 115-*b* may transmit a capability message to the network entity 105-*b*. The capability message may indicate that the UE 115-*b* supports operation in an enhanced uplink carrier aggregation mode for transmission of a first uplink message on a first component carrier overlapping in time with transmission of a second uplink message on a second component carrier. Transmission of the second uplink message in accordance with the enhanced uplink carrier aggregation mode may be associated with one or more interruption time gaps on the first component carrier.

At 810, in some examples, the UE 115-*b* may receive a control message from the network entity 105-*b* based on transmitting the capability message. The control message may indicate a configuration for the UE to operate in the enhanced uplink carrier aggregation mode.

At 815, the UE 115-*b* may transmit the first uplink message to the network entity 105-*b*. The UE 115-*b* may transmit the first uplink message over the first component carrier in accordance with the enhanced uplink carrier aggregation mode. In some examples, the UE 115-*b* may operate in the enhanced uplink carrier aggregation mode based on receiving the control message from the network entity 105-*b*. Additionally or alternatively, the UE 115-*b* may operate in the enhanced uplink carrier aggregation mode based on the capability of the UE 115-*b* to support operation in the enhanced uplink carrier aggregation mode, as indicated via the capability message.

At 820, the UE 115-*b* may transmit the second uplink message to the network entity 105-*b*. The UE 115-*b* may transmit the second uplink message over the second component carrier in accordance with the enhanced uplink carrier aggregation mode. The UE 115-*b* may transmit the second uplink message after at least one of the one or more interruption time gaps on the first component carrier.

Figure 9:
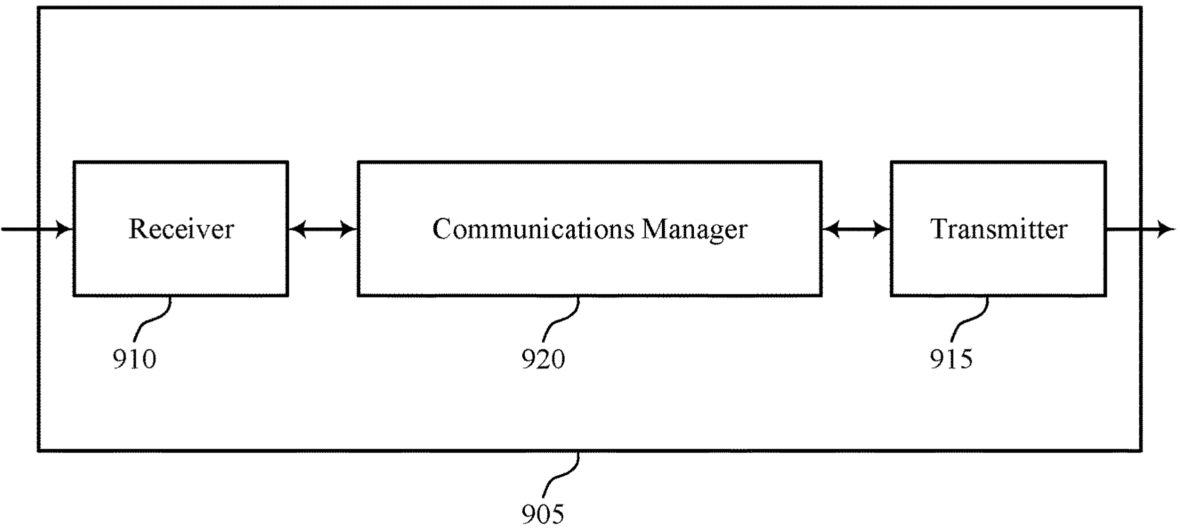
FIGS. 9 and 10 show block diagrams of devices that support carrier switching with uplink carrier aggregation capability in accordance with aspects of the present disclosure.

FIG. 9 shows a block diagram 900 of a device 905 that supports carrier switching with uplink carrier aggregation capability in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to carrier switching with uplink carrier aggregation capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to carrier switching with uplink carrier aggregation capability). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of carrier switching with uplink carrier aggregation capability as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The communications manager 920 may be configured as or otherwise support a means for transmitting the first uplink message over the first component carrier in accordance with the enhanced uplink carrier aggregation mode. The communications manager 920 may be configured as or otherwise support a means for transmitting the second uplink message over the second component carrier after at least one of the one or more interruption time gaps on the first component carrier, in accordance with the enhanced uplink carrier aggregation mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption. The processor of the device 905 (e.g., a UE 115) may operate in an enhanced uplink carrier aggregation mode, in which the processor may operate a transmit chain associated with a component carrier in a dormant mode until a scheduled transmission is set to occur on the component carrier. The processor may activate the transmit chain to perform the scheduled transmission and may deactivate the transmit chain after the scheduled transmission occurs, which may provide for the processor to operate in an uplink carrier aggregation mode for transmission of one or more uplink messages and transition back to communicating via a single component carrier after the transmission, which may reduce power consumption by the processor. Additionally or alternatively, the processor may reduce processing and power consumption by transmitting on two or more component carriers for a portion of time.

Figure 10:
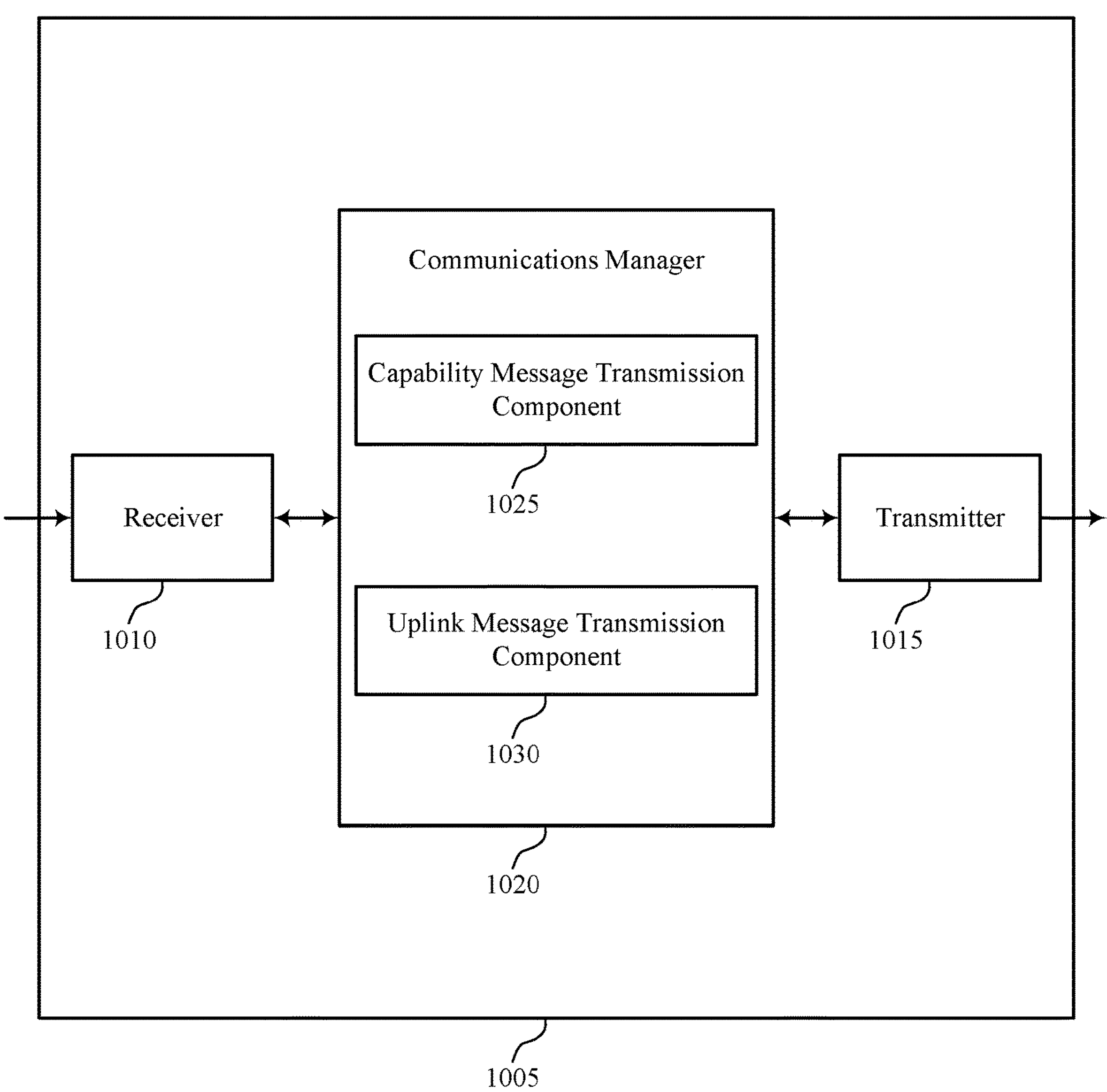

FIG. 10 shows a block diagram 1000 of a device 1005 that supports carrier switching with uplink carrier aggregation capability in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to carrier switching with uplink carrier aggregation capability). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to carrier switching with uplink carrier aggregation capability). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of carrier switching with uplink carrier aggregation capability as described herein. For example, the communications manager 1020 may include a capability message transmission component 1025, an uplink message transmission component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The capability message transmission component 1025 may be configured as or otherwise support a means for transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The uplink message transmission component 1030 may be configured as or otherwise support a means for transmitting the first uplink message over the first component carrier in accordance with the enhanced uplink carrier aggregation mode. The uplink message transmission component 1030 may be configured as or otherwise support a means for transmitting the second uplink message over the second component carrier after at least one of the one or more interruption time gaps on the first component carrier, in accordance with the enhanced uplink carrier aggregation mode.

Figure 11:
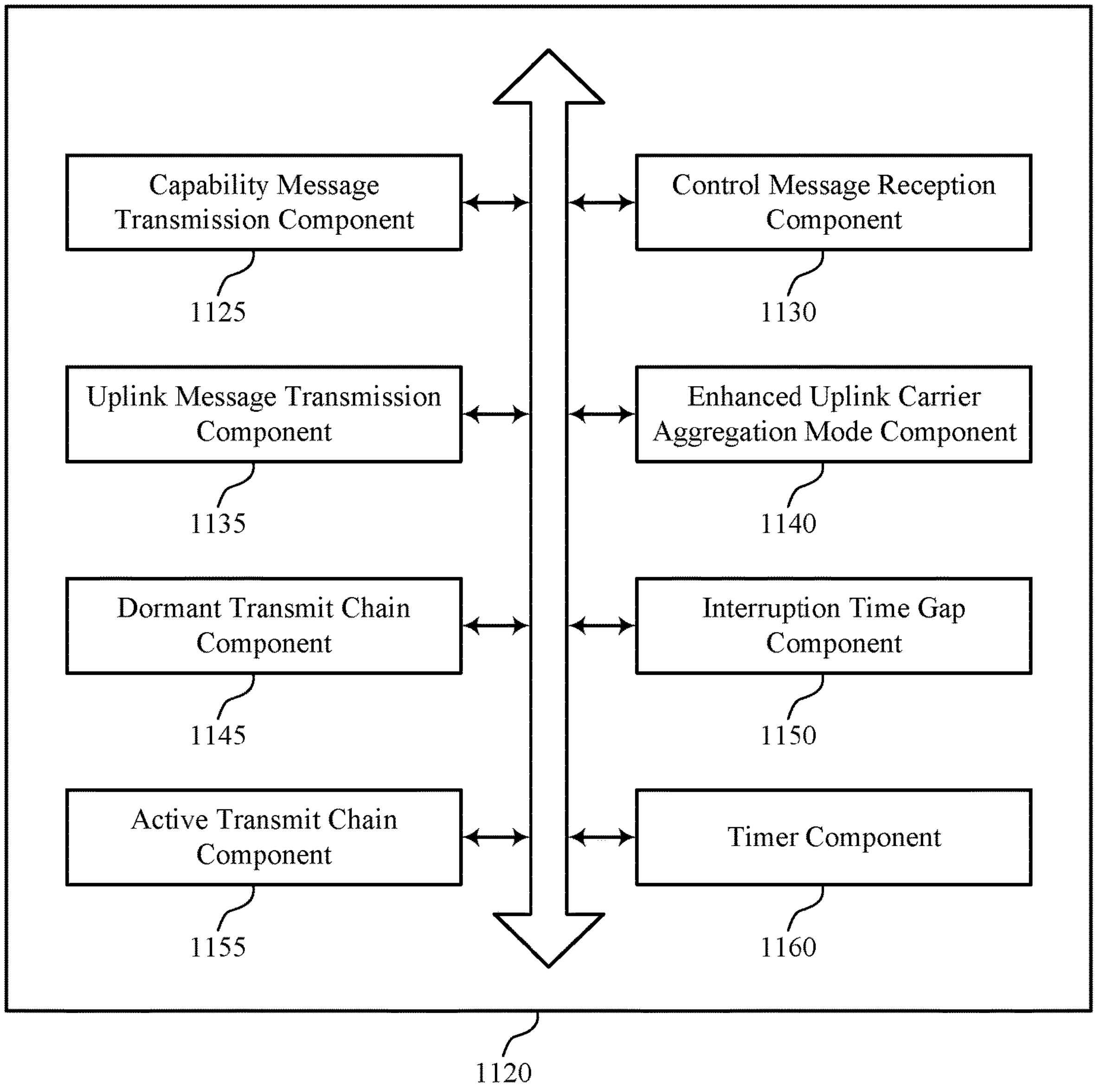
FIG. 11 shows a block diagram of a communications manager that supports carrier switching with uplink carrier aggregation capability in accordance with aspects of the present disclosure.

FIG. 11 shows a block diagram 1100 of a communications manager 1120 that supports carrier switching with uplink carrier aggregation capability in accordance with aspects of the present disclosure. The communications manager 1120 may be an example of aspects of a communications manager 920, a communications manager 1020, or both, as described herein. The communications manager 1120, or various components thereof, may be an example of means for performing various aspects of carrier switching with uplink carrier aggregation capability as described herein. For example, the communications manager 1120 may include a capability message transmission component 1125, a control message reception component 1130, an uplink message transmission component 1135, an enhanced uplink carrier aggregation mode component 1140, a dormant transmit chain component 1145, an interruption time gap component 1150, an active transmit chain component 1155, a timer component 1160, or any combination thereof. Each of these components may communicate, directly or indirectly, with one another (e.g., via one or more buses).

The communications manager 1120 may support wireless communication at a UE in accordance with examples as disclosed herein. The capability message transmission component 1125 may be configured as or otherwise support a means for transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The uplink message transmission component 1135 may be configured as or otherwise support a means for transmitting the first uplink message over the first component carrier in accordance with the enhanced uplink carrier aggregation mode. In some examples, the uplink message transmission component 1135 may be configured as or otherwise support a means for transmitting the second uplink message over the second component carrier after at least one of the one or more interruption time gaps on the first component carrier, in accordance with the enhanced uplink carrier aggregation mode.

In some examples, to support transmitting the capability message, the enhanced uplink carrier aggregation mode component 1140 may be configured as or otherwise support a means for signaling support for the enhanced uplink carrier aggregation mode on a per component carrier basis.

In some examples, to support transmitting the capability message, the dormant transmit chain component 1145 may be configured as or otherwise support a means for indicating, for the second component carrier, that the UE is capable of transitioning a transmit chain associated with the second component carrier between a dormant mode and an active mode.

In some examples, to support transmitting the capability message, the interruption time gap component 1150 may be configured as or otherwise support a means for indicating a duration of the one or more interruption time gaps.

In some examples, the control message reception component 1130 may be configured as or otherwise support a means for receiving, based on the transmitting of the capability message, a control message that indicates a configuration for the UE to operate in the enhanced uplink carrier aggregation mode. In some examples, to support receiving the control message that indicates the configuration, the control message reception component 1130 may be configured as or otherwise support a means for receiving a configuration bit per component carrier, the configuration bit indicating whether the UE is to operate in the enhanced uplink carrier aggregation mode.

In some examples, the dormant transmit chain component 1145 may be configured as or otherwise support a means for operating, in accordance with the enhanced uplink carrier aggregation mode, a transmit chain associated with the second component carrier in a dormant mode prior to a scheduled transmission of the second uplink message over the second component carrier. In some examples, the active transmit chain component 1155 may be configured as or otherwise support a means for activating the transmit chain during at least one of the one or more interruption gaps. In some examples, the active transmit chain component 1155 may be configured as or otherwise support a means for operating, in accordance with the enhanced uplink carrier aggregation mode, the transmit chain in an active mode during the scheduled transmission of the second uplink message over the second component carrier. In some examples, the dormant transmit chain component 1145 may be configured as or otherwise support a means for transitioning the transmit chain from the active mode to the dormant mode after transmission of the second uplink message.

In some examples, to support transitioning the transmit chain from the active mode to the dormant mode, the timer component 1160 may be configured as or otherwise support a means for activating a timer based on transmission of the second uplink message. In some examples, to support transitioning the transmit chain from the active mode to the dormant mode, the dormant transmit chain component 1145 may be configured as or otherwise support a means for transitioning the transmit chain from the active mode to the dormant mode after expiration of the timer.

In some examples, the timer component 1160 may be configured as or otherwise support a means for resetting the timer prior to expiration of the timer and based on the UE being scheduled to transmit additional uplink messages over the second component carrier.

In some examples, the first uplink message and the second uplink message are each SRS messages. In some examples, to support transmitting the capability message, the capability message transmission component 1125 may be configured as or otherwise support a means for signaling support for both uplink carrier aggregation and SRS carrier switching.

In some examples, to support transmitting the capability message, the capability message transmission component 1125 may be configured as or otherwise support a means for indicating support for simultaneous transmissions in connection with SRS carrier switching.

Figure 12:
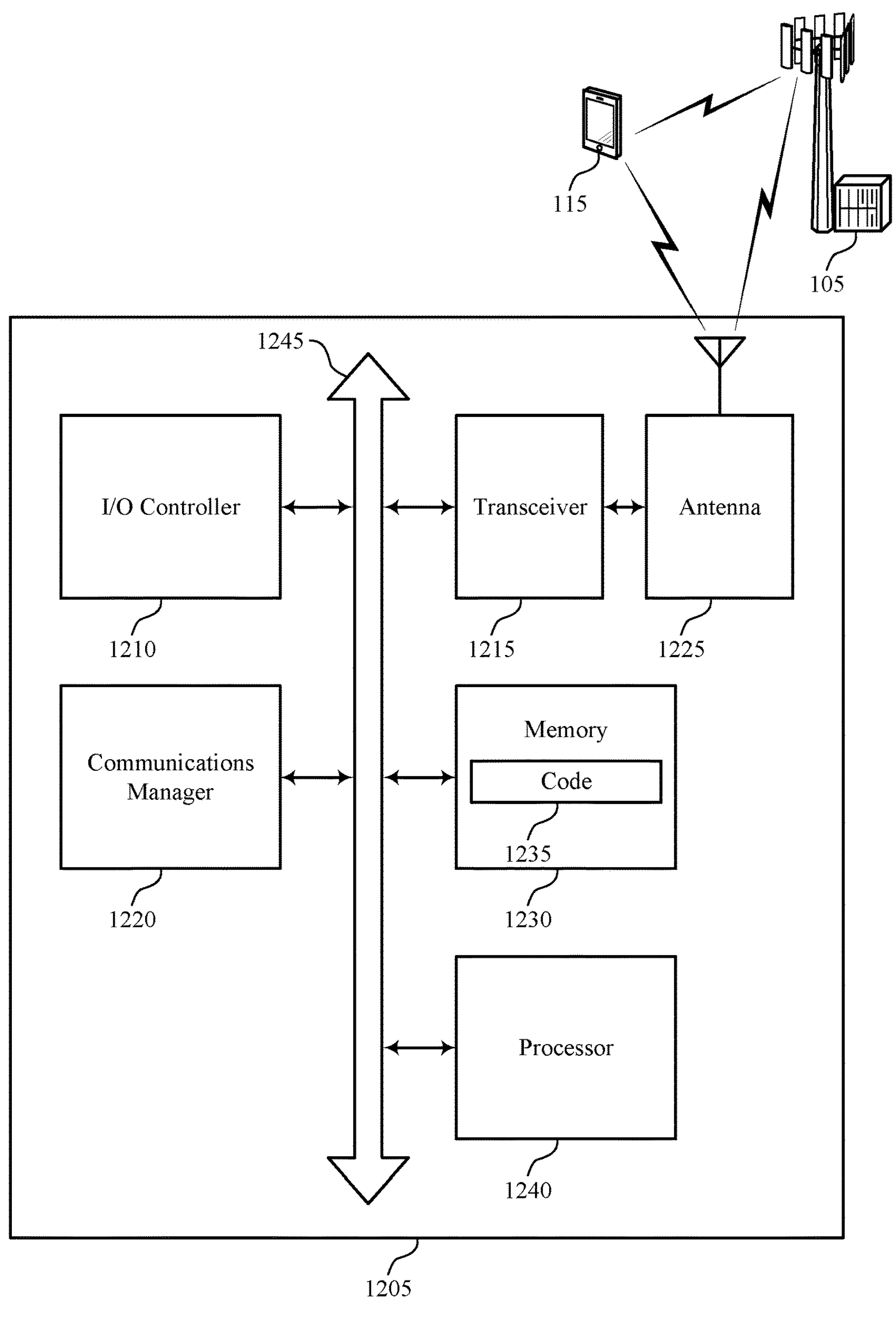
FIG. 12 shows a diagram of a system including a device that supports carrier switching with uplink carrier aggregation capability in accordance with aspects of the present disclosure.

FIG. 12 shows a diagram of a system 1200 including a device 1205 that supports carrier switching with uplink carrier aggregation capability in accordance with aspects of the present disclosure. The device 1205 may be an example of or include the components of a device 905, a device 1005, or a UE 115 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting carrier switching with uplink carrier aggregation capability). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The communications manager 1220 may be configured as or otherwise support a means for transmitting the first uplink message over the first component carrier in accordance with the enhanced uplink carrier aggregation mode. The communications manager 1220 may be configured as or otherwise support a means for transmitting the second uplink message over the second component carrier after at least one of the one or more interruption time gaps on the first component carrier, in accordance with the enhanced uplink carrier aggregation mode.

By including or configuring the communications manager 1220 in accordance with examples as described herein, the device 1205 may support techniques for improved communication reliability, reduced power consumption, improved coordination between devices, and longer battery life. The device 1205 (e.g., a UE 115) may signal, via a capability message, that the device 1205 supports operation in an enhanced uplink carrier aggregation mode, and the device 1205 may receive a configuration for operating in the enhanced uplink carrier aggregation mode in response. By signaling support for the enhanced uplink carrier aggregation mode to another device (e.g., a network entity 105), the device 1205 may support improved coordination between devices and improved communication reliability. Additionally or alternatively, while operating in the enhanced uplink carrier aggregation mode, the device 1205 may transmit one or more uplink messages via two or more component carriers, which may improve communication reliability. The device 1205 may operate a transmit chain associated with at least one of the two or more component carriers in a dormant mode until a scheduled uplink transmission, and the device 1205 may activate the transmit chain to perform the scheduled transmission. By operating the transmit chain in the dormant mode, the device 1205 may reduce power consumption and improve a batter life of the device 1205.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of carrier switching with uplink carrier aggregation capability as described herein, or the processor 1240 and the memory 1230 may be otherwise configured to perform or support such operations.

Figure 13:
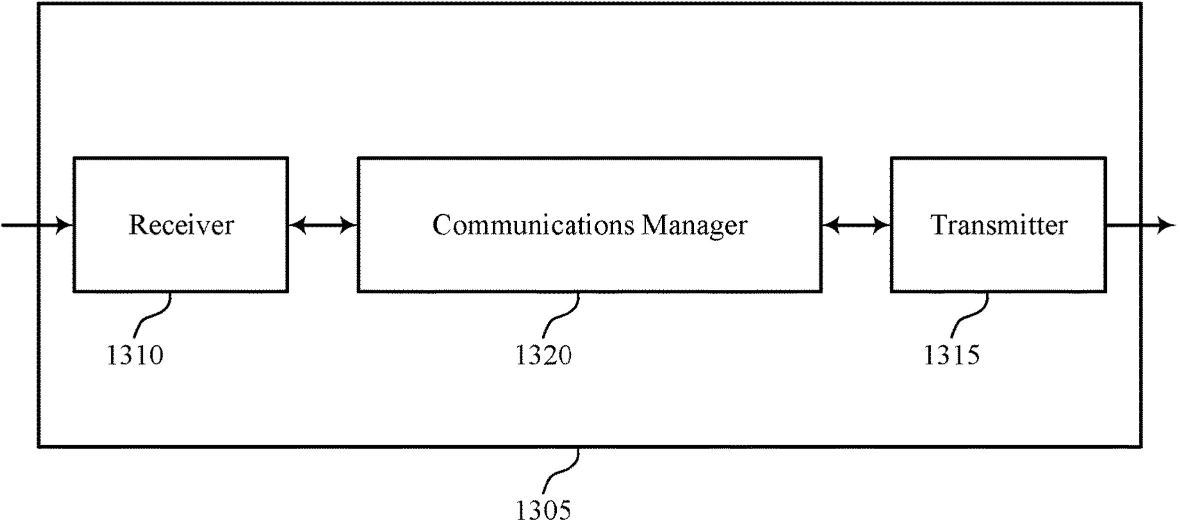
FIGS. 13 and 14 show block diagrams of devices that support carrier switching with uplink carrier aggregation capability in accordance with aspects of the present disclosure.

FIG. 13 shows a block diagram 1300 of a device 1305 that supports carrier switching with uplink carrier aggregation capability in accordance with aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to carrier switching with uplink carrier aggregation capability). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to carrier switching with uplink carrier aggregation capability). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of carrier switching with uplink carrier aggregation capability as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a network entity in accordance with examples as disclosed herein. For example, the communications manager 1320 may be configured as or otherwise support a means for receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The communications manager 1320 may be configured as or otherwise support a means for receiving the first uplink message over the first component carrier in accordance with the enhanced uplink carrier aggregation mode. The communications manager 1320 may be configured as or otherwise support a means for receiving the second uplink message over the second component carrier after at least one of the one or more interruption time gaps on the first component carrier, in accordance with the enhanced uplink carrier aggregation mode.

Figure 14:
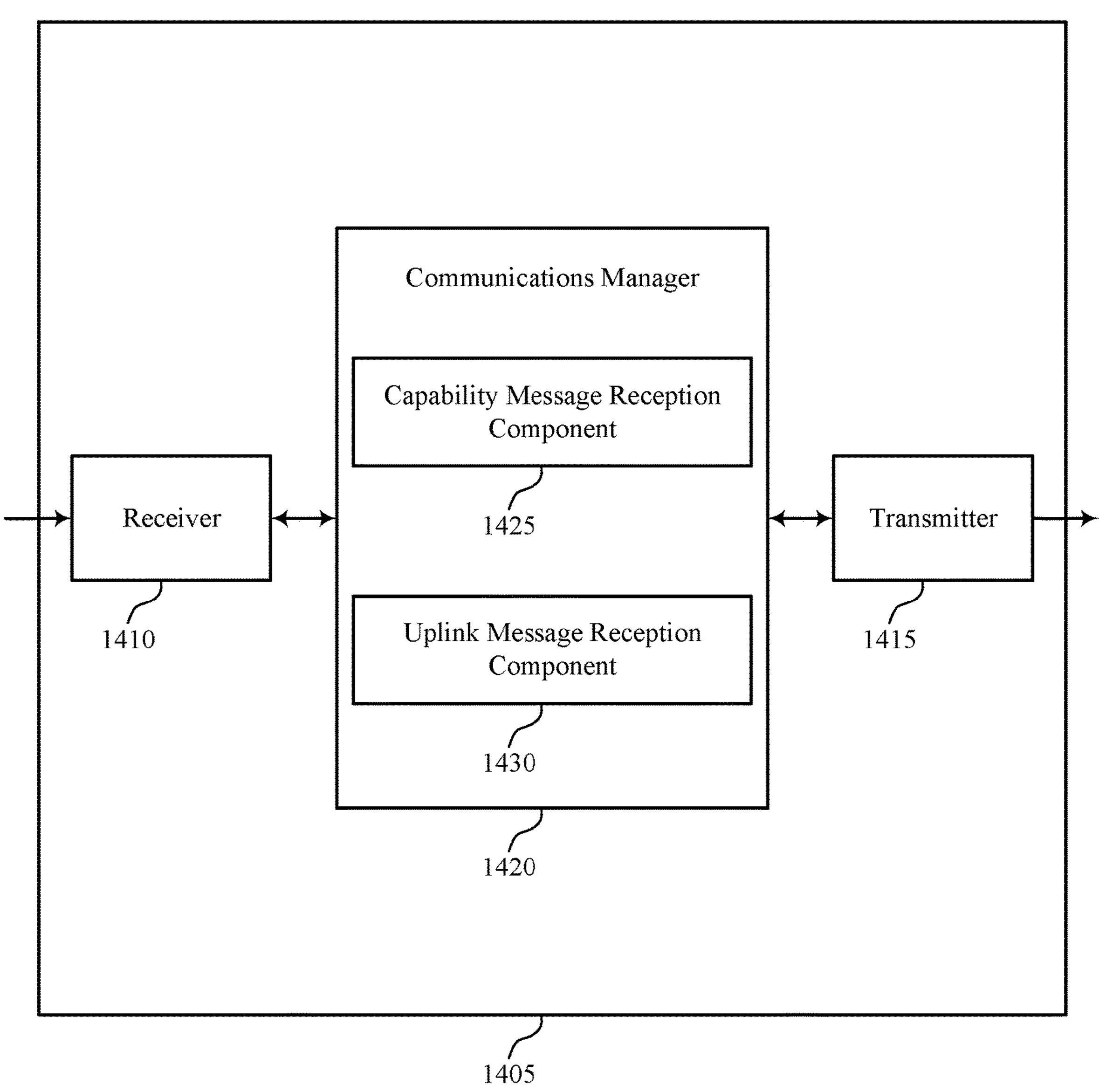

FIG. 14 shows a block diagram 1400 of a device 1405 that supports carrier switching with uplink carrier aggregation capability in accordance with aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to carrier switching with uplink carrier aggregation capability). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to carrier switching with uplink carrier aggregation capability). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of carrier switching with uplink carrier aggregation capability as described herein. For example, the communications manager 1420 may include a capability message reception component 1425, an uplink message reception component 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a network entity in accordance with examples as disclosed herein. The capability message reception component 1425 may be configured as or otherwise support a means for receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The uplink message reception component 1430 may be configured as or otherwise support a means for receiving the first uplink message over the first component carrier in accordance with the enhanced uplink carrier aggregation mode. The uplink message reception component 1430 may be configured as or otherwise support a means for receiving the second uplink message over the second component carrier after at least one of the one or more interruption time gaps on the first component carrier, in accordance with the enhanced uplink carrier aggregation mode.

Figure 15:
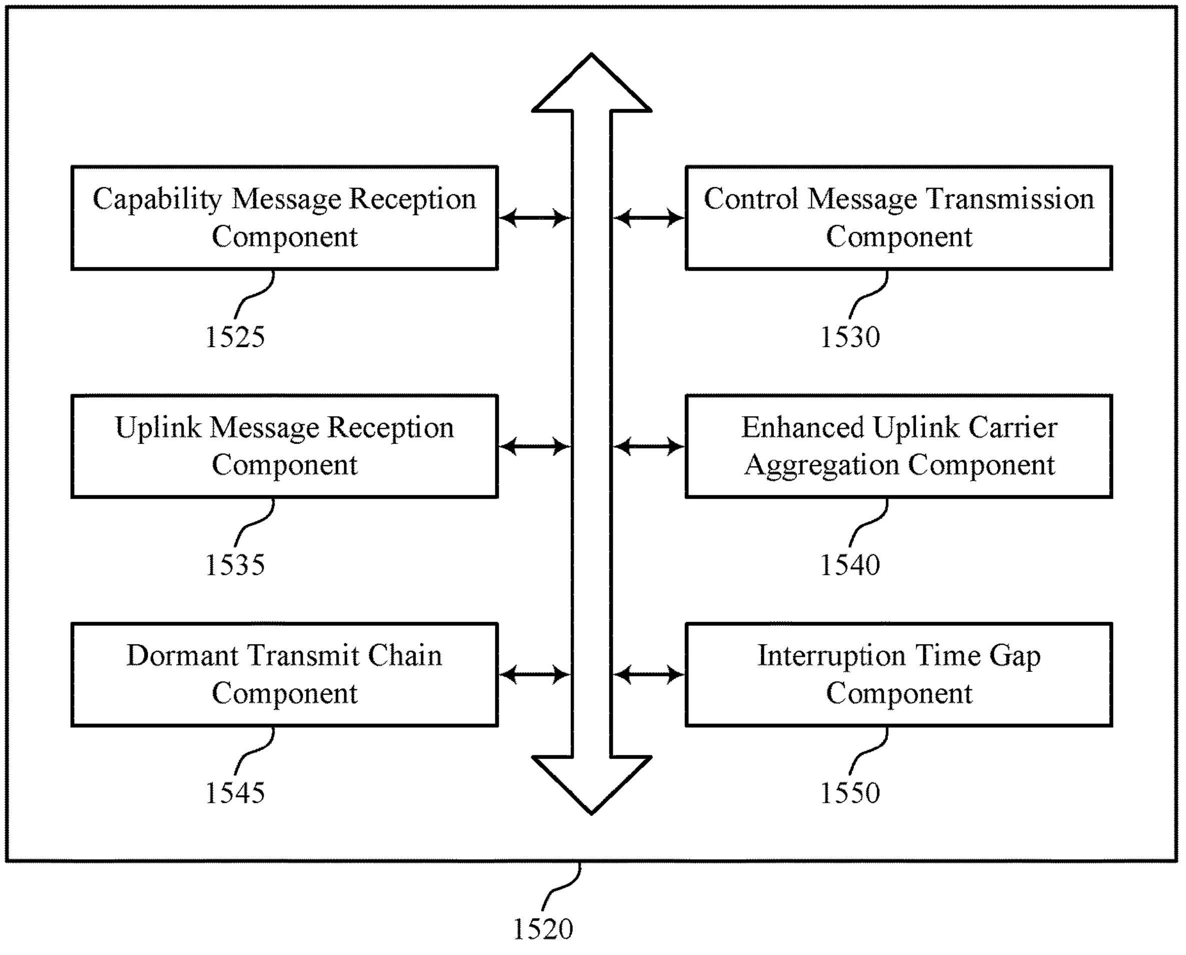
FIG. 15 shows a block diagram of a communications manager that supports carrier switching with uplink carrier aggregation capability in accordance with aspects of the present disclosure.

FIG. 15 shows a block diagram 1500 of a communications manager 1520 that supports carrier switching with uplink carrier aggregation capability in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of carrier switching with uplink carrier aggregation capability as described herein. For example, the communications manager 1520 may include a capability message reception component 1525, a control message transmission component 1530, an uplink message reception component 1535, an enhanced uplink carrier aggregation component 1540, a dormant transmit chain component 1545, an interruption time gap component 1550, or any combination thereof. Each of these components may communicate, directly or indirectly, with one another (e.g., via one or more buses).

The communications manager 1520 may support wireless communication at a network entity in accordance with examples as disclosed herein. The capability message reception component 1525 may be configured as or otherwise support a means for receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The uplink message reception component 1535 may be configured as or otherwise support a means for receiving the first uplink message over the first component carrier in accordance with the enhanced uplink carrier aggregation mode. In some examples, the uplink message reception component 1535 may be configured as or otherwise support a means for receiving the second uplink message over the second component carrier after at least one of the one or more interruption time gaps on the first component carrier, in accordance with the enhanced uplink carrier aggregation mode.

In some examples, to support receiving the capability message, the enhanced uplink carrier aggregation component 1540 may be configured as or otherwise support a means for receiving an indication of support for the enhanced uplink carrier aggregation mode on a per component carrier basis.

In some examples, to support receiving the capability message, the dormant transmit chain component 1545 may be configured as or otherwise support a means for receiving an indication, for the second component carrier, that the UE is capable of transitioning a transmit chain associated with the second component carrier between a dormant mode and an active mode.

In some examples, to support receiving the capability message, the interruption time gap component 1550 may be configured as or otherwise support a means for receiving an indication of a duration of the one or more interruption time gaps.

In some examples, the control message transmission component 1530 may be configured as or otherwise support a means for transmitting, based on the capability message, a control message that indicates a configuration for the UE to operate in the enhanced uplink carrier aggregation mode. In some examples, to support transmitting the control message that indicates the configuration, the enhanced uplink carrier aggregation component 1540 may be configured as or otherwise support a means for transmitting a configuration bit per component carrier, the configuration bit indicating whether the UE is to operate in the enhanced uplink carrier aggregation mode.

In some examples, the first uplink message and the second uplink message are each SRS messages. In some examples, to support receiving the capability message, the capability message reception component 1525 may be configured as or otherwise support a means for receiving an indication of support for both uplink carrier aggregation and SRS carrier switching.

In some examples, to support receiving the capability message, the capability message reception component 1525 may be configured as or otherwise support a means for receiving an indication of support for simultaneous transmissions in connection with SRS carrier switching.

Figure 16:
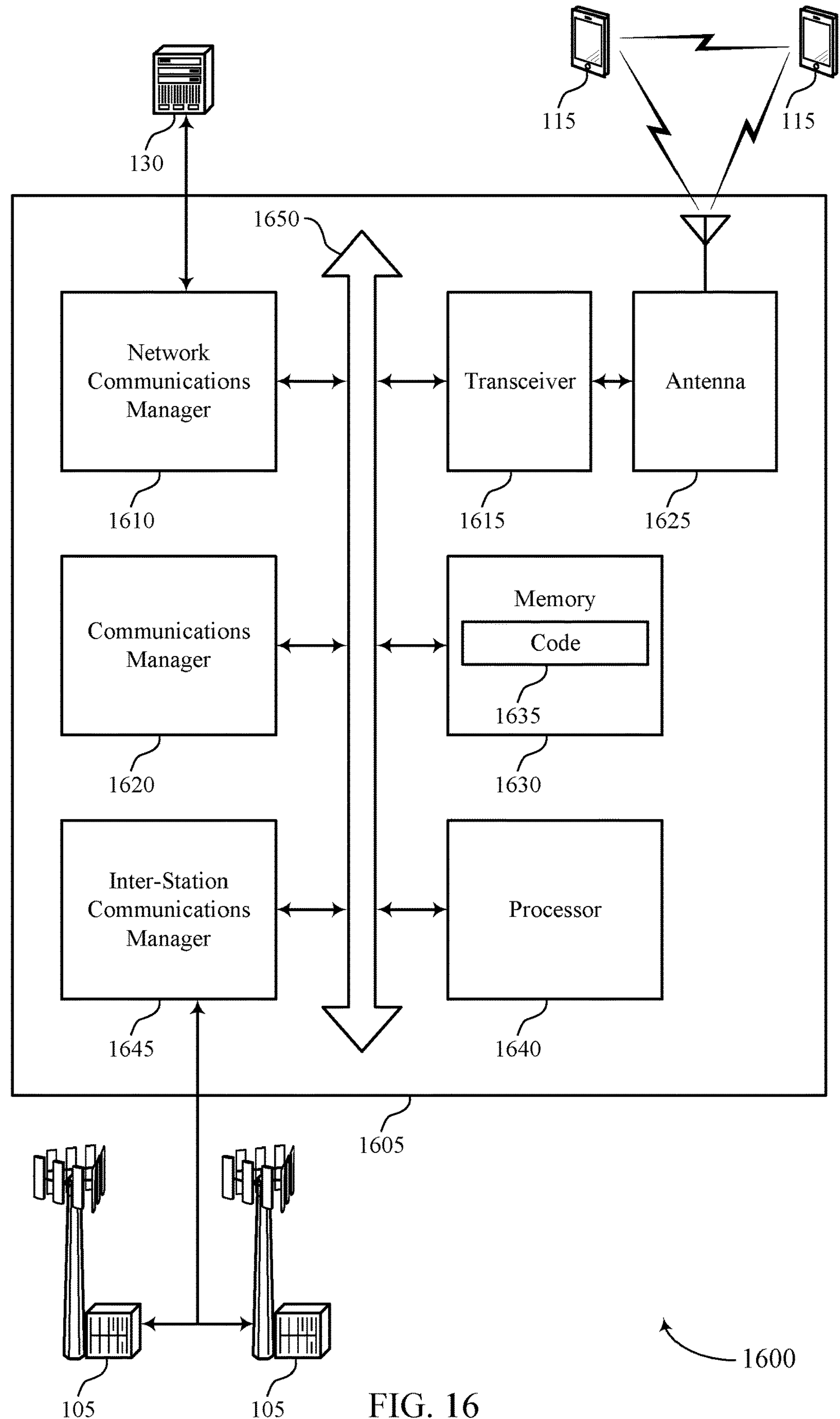
FIG. 16 shows a diagram of a system including a device that supports carrier switching with uplink carrier aggregation capability in accordance with aspects of the present disclosure.

FIG. 16 shows a diagram of a system 1600 including a device 1605 that supports carrier switching with uplink carrier aggregation capability in accordance with aspects of the present disclosure. The device 1605 may be an example of or include the components of a device 1305, a device 1405, or a network entity 105 as described herein. The device 1605 may communicate wirelessly with one or more network entities 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting carrier switching with uplink carrier aggregation capability). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other network entities 105, and may include a controller or scheduler for controlling communications with UEs 115 in cooperation with other network entities 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The communications manager 1620 may be configured as or otherwise support a means for receiving the first uplink message over the first component carrier in accordance with the enhanced uplink carrier aggregation mode. The communications manager 1620 may be configured as or otherwise support a means for receiving the second uplink message over the second component carrier after at least one of the one or more interruption time gaps on the first component carrier, in accordance with the enhanced uplink carrier aggregation mode.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of carrier switching with uplink carrier aggregation capability as described herein, or the processor 1640 and the memory 1630 may be otherwise configured to perform or support such operations.

FIG. 17 shows a flowchart illustrating a method 1700 that supports carrier switching with uplink carrier aggregation capability in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The operations of 1705 may be performed in accordance with examples as disclosed herein. In some examples, aspects of the operations of 1705 may be performed by a capability message transmission component 1125 as described with reference to FIG. 11.

At 1710, the method may include transmitting the first uplink message over the first component carrier in accordance with the enhanced uplink carrier aggregation mode. The operations of 1710 may be performed in accordance with examples as disclosed herein. In some examples, aspects of the operations of 1710 may be performed by an uplink message transmission component 1135 as described with reference to FIG. 11.

At 1715, the method may include transmitting the second uplink message over the second component carrier after at least one of the one or more interruption time gaps on the first component carrier, in accordance with the enhanced uplink carrier aggregation mode. The operations of 1715 may be performed in accordance with examples as disclosed herein. In some examples, aspects of the operations of 1715 may be performed by an uplink message transmission component 1135 as described with reference to FIG. 11.

Figure 18:
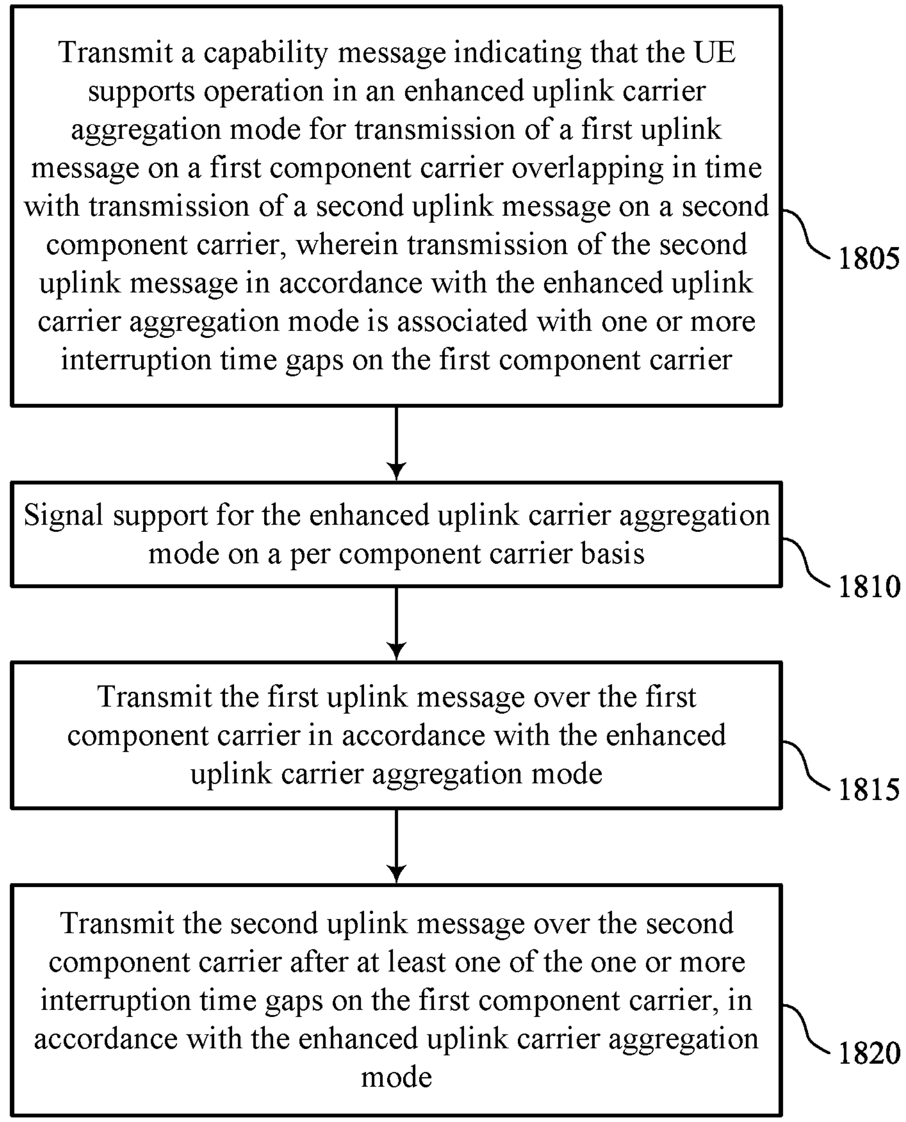

FIG. 18 shows a flowchart illustrating a method 1800 that supports carrier switching with uplink carrier aggregation capability in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The operations of 1805 may be performed in accordance with examples as disclosed herein. In some examples, aspects of the operations of 1805 may be performed by a capability message transmission component 1125 as described with reference to FIG. 11.

At 1810, the method may include signaling support for the enhanced uplink carrier aggregation mode on a per component carrier basis. The operations of 1810 may be performed in accordance with examples as disclosed herein. In some examples, aspects of the operations of 1810 may be performed by an enhanced uplink carrier aggregation mode component 1140 as described with reference to FIG. 11.

At 1815, the method may include transmitting the first uplink message over the first component carrier in accordance with the enhanced uplink carrier aggregation mode. The operations of 1815 may be performed in accordance with examples as disclosed herein. In some examples, aspects of the operations of 1815 may be performed by an uplink message transmission component 1135 as described with reference to FIG. 11.

At 1820, the method may include transmitting the second uplink message over the second component carrier after at least one of the one or more interruption time gaps on the first component carrier, in accordance with the enhanced uplink carrier aggregation mode. The operations of 1820 may be performed in accordance with examples as disclosed herein. In some examples, aspects of the operations of 1820 may be performed by an uplink message transmission component 1135 as described with reference to FIG. 11.

Figure 19:
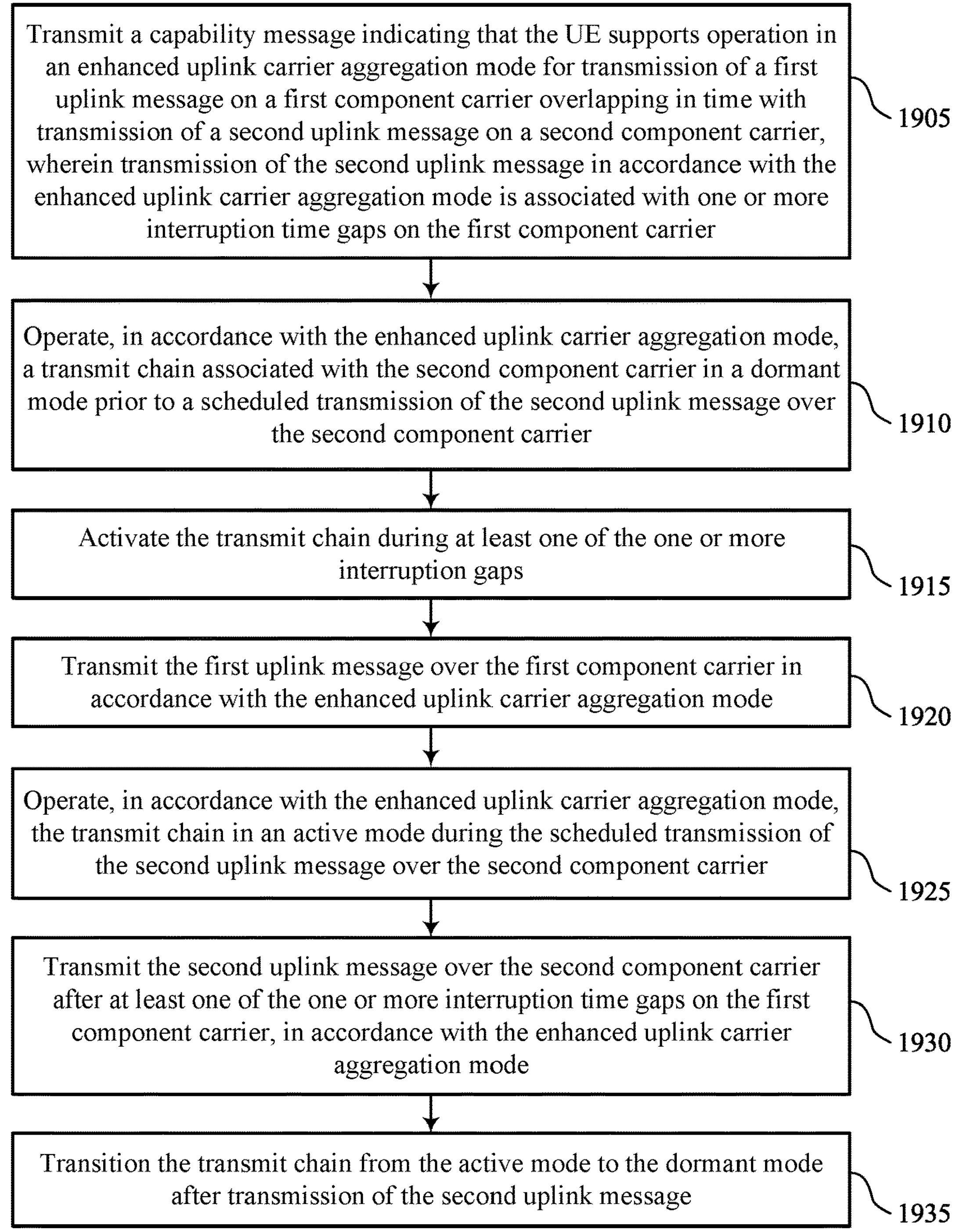

FIG. 19 shows a flowchart illustrating a method 1900 that supports carrier switching with uplink carrier aggregation capability in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include transmitting a capability message indicating that the UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The operations of 1905 may be performed in accordance with examples as disclosed herein. In some examples, aspects of the operations of 1905 may be performed by a capability message transmission component 1125 as described with reference to FIG. 11.

At 1910, the method may include operating, in accordance with the enhanced uplink carrier aggregation mode, a transmit chain associated with the second component carrier in a dormant mode prior to a scheduled transmission of the second uplink message over the second component carrier. The operations of 1910 may be performed in accordance with examples as disclosed herein. In some examples, aspects of the operations of 1910 may be performed by a dormant transmit chain component 1145 as described with reference to FIG. 11.

At 1915, the method may include activating the transmit chain during at least one of the one or more interruption gaps. The operations of 1915 may be performed in accordance with examples as disclosed herein. In some examples, aspects of the operations of 1915 may be performed by an active transmit chain component 1155 as described with reference to FIG. 11.

At 1920, the method may include transmitting the first uplink message over the first component carrier in accordance with the enhanced uplink carrier aggregation mode. The operations of 1920 may be performed in accordance with examples as disclosed herein. In some examples, aspects of the operations of 1920 may be performed by an uplink message transmission component 1135 as described with reference to FIG. 11.

At 1925, the method may include operating, in accordance with the enhanced uplink carrier aggregation mode, the transmit chain in an active mode during the scheduled transmission of the second uplink message over the second component carrier. The operations of 1925 may be performed in accordance with examples as disclosed herein. In some examples, aspects of the operations of 1925 may be performed by an active transmit chain component 1155 as described with reference to FIG. 11.

At 1930, the method may include transmitting the second uplink message over the second component carrier after at least one of the one or more interruption time gaps on the first component carrier, in accordance with the enhanced uplink carrier aggregation mode. The operations of 1930 may be performed in accordance with examples as disclosed herein. In some examples, aspects of the operations of 1930 may be performed by an uplink message transmission component 1135 as described with reference to FIG. 11.

At 1935, the method may include transitioning the transmit chain from the active mode to the dormant mode after transmission of the second uplink message. The operations of 1935 may be performed in accordance with examples as disclosed herein. In some examples, aspects of the operations of 1935 may be performed by a dormant transmit chain component 1145 as described with reference to FIG. 11.

FIG. 20 shows a flowchart illustrating a method 2000 that supports carrier switching with uplink carrier aggregation capability in accordance with aspects of the present disclosure. The operations of the method 2000 may be implemented by a network entity or its components as described herein. For example, the operations of the method 2000 may be performed by a network entity 105 as described with reference to FIGS. 1 through 8 and 13 through 16. In some examples, a network entity may execute a set of instructions to control the functional elements of the network entity to perform the described functions. Additionally or alternatively, the network entity may perform aspects of the described functions using special-purpose hardware.

At 2005, the method may include receiving a capability message indicating that a UE supports operation in an enhanced uplink carrier aggregation mode for transmission of a first uplink message on a first component carrier overlapping in time with transmission of a second uplink message on a second component carrier, where transmission of the second uplink message in accordance with the enhanced uplink carrier aggregation mode is associated with one or more interruption time gaps on the first component carrier. The operations of 2005 may be performed in accordance with examples as disclosed herein. In some examples, aspects of the operations of 2005 may be performed by a capability message reception component 1525 as described with reference to FIG. 15.

At 2010, the method may include receiving the first uplink message over the first component carrier in accordance with the enhanced uplink carrier aggregation mode. The operations of 2010 may be performed in accordance with examples as disclosed herein. In some examples, aspects of the operations of 2010 may be performed by an uplink message reception component 1535 as described with reference to FIG. 15.

At 2015, the method may include receiving the second uplink message over the second component carrier after at least one of the one or more interruption time gaps on the first component carrier, in accordance with the enhanced uplink carrier aggregation mode. The operations of 2015 may be performed in accordance with examples as disclosed herein. In some examples, aspects of the operations of 2015 may be performed by an uplink message reception component 1535 as described with reference to FIG. 15.

The following provides an overview of aspects of the present disclosure:

Aspect 1: A method for wireless communication at a UE, comprising: transmitting a capability message indicating that the UE supports operation in an enhanced uplink carrier aggregation mode for transmission of a first uplink message on a first component carrier overlapping in time with transmission of a second uplink message on a second component carrier, wherein transmission of the second uplink message in accordance with the enhanced uplink carrier aggregation mode is associated with one or more interruption time gaps on the first component carrier; transmitting the first uplink message over the first component carrier in accordance with the enhanced uplink carrier aggregation mode; and transmitting the second uplink message over the second component carrier after at least one of the one or more interruption time gaps on the first component carrier, in accordance with the enhanced uplink carrier aggregation mode.

Aspect 2: The method of aspect 1, wherein transmitting the capability message further comprises: signaling support for the enhanced uplink carrier aggregation mode on a per component carrier basis.

Aspect 3: The method of any of aspects 1 through 2, wherein transmitting the capability message further comprises: indicating, for the second component carrier, that the UE is capable of transitioning a transmit chain associated with the second component carrier between a dormant mode and an active mode.

Aspect 4: The method of any of aspects 1 through 3, wherein transmitting the capability message further comprises: indicating a duration of the one or more interruption time gaps.

Aspect 5: The method of any of aspects 1 through 4, further comprising: receiving, based at least in part on the transmitting of the capability message, a control message that indicates a configuration for the UE to operate in the enhanced uplink carrier aggregation mode.

Aspect 6: The method of aspect 5, wherein receiving the control message that indicates the configuration further comprises: receiving a configuration bit per component carrier, the configuration bit indicating whether the UE is to operate in the enhanced uplink carrier aggregation mode.

Aspect 7: The method of any of aspects 1 through 6, further comprising: operating, in accordance with the enhanced uplink carrier aggregation mode, a transmit chain associated with the second component carrier in a dormant mode prior to a scheduled transmission of the second uplink message over the second component carrier; activating the transmit chain during at least one of the one or more interruption time gaps; operating, in accordance with the enhanced uplink carrier aggregation mode, the transmit chain in an active mode during the scheduled transmission of the second uplink message over the second component carrier; and transitioning the transmit chain from the active mode to the dormant mode after transmission of the second uplink message.

Aspect 8: The method of aspect 7, wherein transitioning the transmit chain from the active mode to the dormant mode further comprises: activating a timer based on transmission of the second uplink message; and transitioning the transmit chain from the active mode to the dormant mode after expiration of the timer.

Aspect 9: The method of aspect 8, further comprising: resetting the timer prior to expiration of the timer and based at least in part on the UE being scheduled to transmit additional uplink messages over the second component carrier.

Aspect 10: The method of any of aspects 1 through 9, wherein the first uplink message and the second uplink message are each sounding reference signal messages.

Aspect 11: The method of any of aspects 1 through 10, wherein transmitting the capability message further comprises: signaling support for both uplink carrier aggregation and sounding reference signal carrier switching.

Aspect 12: The method of aspect 11, wherein transmitting the capability message further comprises: indicating support for simultaneous transmissions in connection with sounding reference signal carrier switching.

Aspect 13: A method for wireless communication at a network entity, comprising: receiving a capability message indicating that a UE supports operation in an enhanced uplink carrier aggregation mode for transmission of a first uplink message on a first component carrier overlapping in time with transmission of a second uplink message on a second component carrier, wherein transmission of the second uplink message in accordance with the enhanced uplink carrier aggregation mode is associated with one or more interruption time gaps on the first component carrier; and receiving the first uplink message over the first component carrier in accordance with the enhanced uplink carrier aggregation mode; and receiving the second uplink message over the second component carrier after at least one of the one or more interruption time gaps on the first component carrier, in accordance with the enhanced uplink carrier aggregation mode.

Aspect 14: The method of aspect 13, wherein receiving the capability message further comprises: receiving an indication of support for the enhanced uplink carrier aggregation mode on a per component carrier basis.

Aspect 15: The method of any of aspects 13 through 14, wherein receiving the capability message further comprises: receiving an indication, for the second component carrier, that the UE is capable of transitioning a transmit chain associated with the second component carrier between a dormant mode and an active mode.

Aspect 16: The method of any of aspects 13 through 15, wherein receiving the capability message further comprises: receiving an indication of a duration of the one or more interruption time gaps.

Aspect 17: The method of any of aspects 13 through 16, further comprising: transmitting, based at least in part on the capability message, a control message that indicates a configuration for the UE to operate in the enhanced uplink carrier aggregation mode.

Aspect 18: The method of aspect 17, wherein transmitting the control message that indicates the configuration further comprises: transmitting a configuration bit per component carrier, the configuration bit indicating whether the UE is to operate in the enhanced uplink carrier aggregation mode.

Aspect 19: The method of any of aspects 13 through 18, wherein the first uplink message and the second uplink message are each sounding reference signal messages.

Aspect 20: The method of any of aspects 13 through 19, wherein receiving the capability message further comprises: receiving an indication of support for both uplink carrier aggregation and sounding reference signal carrier switching.

Aspect 21: The method of aspect 20, wherein receiving the capability message further comprises: receiving an indication of support for simultaneous transmissions in connection with sounding reference signal carrier switching.

Aspect 22: An apparatus for wireless communication at a UE, comprising a processor; memory coupled with the processor; and instructions stored in the memory and executable by the processor to cause the apparatus to perform a method of any of aspects 1 through 12.

Aspect 23: An apparatus for wireless communication at a UE, comprising at least one means for performing a method of any of aspects 1 through 12.

Aspect 24: A non-transitory computer-readable medium storing code for wireless communication at a UE, the code comprising instructions executable by a processor to perform a method of any of aspects 1 through 12.

Aspect 25: An apparatus for wireless communication at a network entity, comprising a processor; memory coupled with the processor; and instructions stored in the memory and executable by the processor to cause the apparatus to perform a method of any of aspects 13 through 21.

Aspect 26: An apparatus for wireless communication at a network entity, comprising at least one means for performing a method of any of aspects 13 through 21.

Aspect 27: A non-transitory computer-readable medium storing code for wireless communication at a network entity, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

transmitting a capability message indicating that the UE supports operation in an enhanced uplink carrier aggregation mode for transmission of a first uplink message on a first component carrier overlapping in time with transmission of a second uplink message on a second component carrier, wherein the enhanced uplink carrier aggregation mode is associated with one or more interruption time gaps on the first component carrier;

transmitting, during a symbol duration that follows an interruption time gap of the one or more interruption time gaps, the first uplink message over the first component carrier in accordance with the enhanced uplink carrier aggregation mode; and transmitting, during the symbol duration that follows the interruption time gap of the one or more interruption time gaps, the second uplink message over the second component carrier in accordance with the enhanced uplink carrier aggregation mode.

2. The method of claim 1, wherein transmitting the capability message further comprises:

signaling support for the enhanced uplink carrier aggregation mode on a per component carrier basis.

3. The method of claim 1, wherein transmitting the capability message further comprises:

indicating, for the second component carrier, that the UE is capable of transitioning a transmit chain associated with the second component carrier between a dormant mode and an active mode.

4. The method of claim 1, wherein transmitting the capability message further comprises:

indicating a duration of the one or more interruption time gaps.

5. The method of claim 1, further comprising:

receiving, based at least in part on the transmitting of the capability message, a control message that indicates a configuration for the UE to operate in the enhanced uplink carrier aggregation mode.

6. The method of claim 5, wherein receiving the control message that indicates the configuration further comprises:

receiving a configuration bit per component carrier, the configuration bit indicating whether the UE is to operate in the enhanced uplink carrier aggregation mode.

7. The method of claim 1, further comprising:

operating, in accordance with the enhanced uplink carrier aggregation mode, a transmit chain associated with the second component carrier in a dormant mode prior to a scheduled transmission of the second uplink message over the second component carrier;

activating the transmit chain during at least one of the one or more interruption time gaps;

operating, in accordance with the enhanced uplink carrier aggregation mode, the transmit chain in an active mode during the scheduled transmission of the second uplink message over the second component carrier; and transitioning the transmit chain from the active mode to the dormant mode after transmission of the second uplink message.

8. The method of claim 7, wherein transitioning the transmit chain from the active mode to the dormant mode further comprises:

activating a timer based on transmission of the second uplink message; and transitioning the transmit chain from the active mode to the dormant mode after expiration of the timer.

9. The method of claim 8, further comprising:

resetting the timer prior to expiration of the timer and based at least in part on the UE being scheduled to transmit additional uplink messages over the second component carrier.

10. The method of claim 1, wherein the first uplink message and the second uplink message are each sounding reference signal messages.

11. The method of claim 1, wherein transmitting the capability message further comprises:

signaling support for both uplink carrier aggregation and sounding reference signal carrier switching.

12. The method of claim 11, wherein transmitting the capability message further comprises:

indicating support for simultaneous transmissions in connection with sounding reference signal carrier switching.

13. A method for wireless communication at a network entity, comprising:

receiving a capability message indicating that a user equipment (UE) supports operation in an enhanced uplink carrier aggregation mode for transmission of a first uplink message on a first component carrier overlapping in time with transmission of a second uplink message on a second component carrier, wherein the enhanced uplink carrier aggregation mode is associated with one or more interruption time gaps on the first component carrier;

receiving, during a symbol duration that follows an interruption time gap of the one or more interruption time gaps, the first uplink message over the first component carrier in accordance with the enhanced uplink carrier aggregation mode; and receiving, during the symbol duration that follows the interruption time gap of the one or more interruption time gaps, the second uplink message over the second component carrier, in accordance with the enhanced uplink carrier aggregation mode.

14. The method of claim 13, wherein receiving the capability message further comprises:

receiving an indication of support for the enhanced uplink carrier aggregation mode on a per component carrier basis.

15. The method of claim 13, wherein receiving the capability message further comprises:

receiving an indication, for the second component carrier, that the UE is capable of transitioning a transmit chain associated with the second component carrier between a dormant mode and an active mode.

16. The method of claim 13, wherein receiving the capability message further comprises:

receiving an indication of a duration of the one or more interruption time gaps.

17. The method of claim 13, further comprising:

transmitting, based at least in part on the capability message, a control message that indicates a configuration for the UE to operate in the enhanced uplink carrier aggregation mode.

18. The method of claim 17, wherein transmitting the control message that indicates the configuration further comprises:

transmitting a configuration bit per component carrier, the configuration bit indicating whether the UE is to operate in the enhanced uplink carrier aggregation mode.

19. The method of claim 13, wherein the first uplink message and the second uplink message are each sounding reference signal messages.

20. The method of claim 13, wherein receiving the capability message further comprises:

receiving an indication of support for both uplink carrier aggregation and sounding reference signal carrier switching.

21. The method of claim 20, wherein receiving the capability message further comprises:

receiving an indication of support for simultaneous transmissions in connection with sounding reference signal carrier switching.

22. A user equipment (UE) for wireless communication, comprising:

one or more processors; and one or more memories storing instructions executable by the one or more processors to cause the UE to:

transmit a capability message indicating that the UE supports operation in an enhanced uplink carrier aggregation mode for transmission of a first uplink message on a first component carrier overlapping in time with transmission of a second uplink message on a second component carrier, wherein the enhanced uplink carrier aggregation mode is associated with one or more interruption time gaps on the first component carrier;

transmit, during a symbol duration that follows an interruption time gap of the one or more interruption time gaps, the first uplink message over the first component carrier in accordance with the enhanced uplink carrier aggregation mode; and transmit, during the symbol duration that follows the interruption time gap of the one or more interruption time gaps, the second uplink message over the second component carrier, in accordance with the enhanced uplink carrier aggregation mode.

23. The UE of claim 22, wherein, to transmit the capability message, the instructions are executable by the one or more processors to cause the UE to:

signal support for the enhanced uplink carrier aggregation mode on a per component carrier basis.

24. The UE of claim 22, wherein, to transmit the capability message, the instructions are executable by the one or more processors to cause the UE to:

indicate, for the second component carrier, that the UE is capable of transitioning a transmit chain associated with the second component carrier between a dormant mode and an active mode.

25. The UE of claim 22, wherein, to transmit the capability message, the instructions are executable by the one or more processors to cause the UE to:

indicate a duration of the one or more interruption time gaps.

26. The UE of claim 22, wherein the instructions are further executable by the one or more processors to cause the UE to:

receive, based at least in part on transmission of the capability message, a control message that indicates a configuration for the UE to operate in the enhanced uplink carrier aggregation mode.

27. A network entity for wireless communication, comprising:

one or more processors; and one or more memories storing instructions executable by the one or more processors to cause the network entity to:

receive a capability message indicating that a user equipment (UE) supports operation in an enhanced uplink carrier aggregation mode for transmission of a first uplink message on a first component carrier overlapping in time with transmission of a second uplink message on a second component carrier, wherein the enhanced uplink carrier aggregation mode is associated with one or more interruption time gaps on the first component carrier;

receive, during a symbol duration that follows an interruption time gap of the one or more interruption time gaps, the first uplink message over the first component carrier in accordance with the enhanced uplink carrier aggregation mode; and receive, during the symbol duration that follows the interruption time gap of the one or more interruption time gaps, the second uplink message over the second component carrier, in accordance with the enhanced uplink carrier aggregation mode.

28. The network entity of claim 27, wherein, to receive the capability message, the instructions are executable by the one or more processors to cause the network entity to:

receive an indication of support for the enhanced uplink carrier aggregation mode on a per component carrier basis.

29. The network entity of claim 27, wherein, to receive the capability message, the instructions are executable by the one or more processors to cause the network entity to:

receive an indication, for the second component carrier, that the UE is capable of transitioning a transmit chain associated with the second component carrier between a dormant mode and an active mode.

30. The network entity of claim 27, wherein, to receive the capability message, the instructions are executable by the one or more processors to cause the network entity to:

receive an indication of a duration of the one or more interruption time gaps.

* * * * *